(12) United States Patent
Kataoka et al.

(10) Patent No.: US 7,910,178 B2
(45) Date of Patent: Mar. 22, 2011

(54) LIQUID CRYSTAL DISPLAY DEVICE AND METHOD OF PRODUCING THE SAME

(75) Inventors: Shingo Kataoka, Kawasaki (JP); Katsufumi Ohmuro, Kawasaki (JP); Hideaki Tsuda, Kawasaki (JP); Jin Hirosawa, Kawasaki (JP)

(73) Assignees: Fujitsu Limited, Kawasaki (JP); AU Optronics Corporation, Hsinchu (TW)

( * ) Notice: Subject to any disclaimer, the term of this patent is extended or adjusted under 35 U.S.C. 154(b) by 567 days.

(21) Appl. No.: 11/099,421

(22) Filed: Apr. 5, 2005

(65) Prior Publication Data
US 2005/0264737 A1     Dec. 1, 2005

(30) Foreign Application Priority Data

May 28, 2004 (JP) ................... 2004-159645

(51) Int. Cl.
C09K 19/54 (2006.01)
C09K 19/38 (2006.01)
G02F 1/1333 (2006.01)

(52) U.S. Cl. .............. 428/1.1; 428/1.3; 349/86; 349/88; 349/94; 252/299.5

(58) Field of Classification Search .............. 349/86–94, 349/124; 428/1.1–1.62
See application file for complete search history.

(56) References Cited

U.S. PATENT DOCUMENTS

| | | | |
|---|---|---|---|
| 5,327,271 A * | 7/1994 | Takeuchi et al. | 349/88 |
| 5,473,450 A * | 12/1995 | Yamada et al. | 349/84 |
| 5,769,393 A * | 6/1998 | Kobayashi et al. | 252/299.01 |
| 5,796,453 A * | 8/1998 | Nakao et al. | 349/86 |
| 6,429,914 B1 | 8/2002 | Kubota et al. | |
| 6,452,650 B1 * | 9/2002 | Nakao et al. | 349/86 |
| 6,466,296 B1 | 10/2002 | Yamada et al. | |
| 6,861,107 B2 * | 3/2005 | Klasen-Memmer et al. | 428/1.1 |
| 7,038,743 B2 * | 5/2006 | Komitov et al. | 349/88 |
| 7,113,241 B2 * | 9/2006 | Hanaoka | 349/139 |
| 2003/0067579 A1 * | 4/2003 | Inoue et al. | 349/187 |
| 2003/0095229 A1 * | 5/2003 | Inoue et al. | 349/187 |
| 2003/0137620 A1 * | 7/2003 | Wang et al. | 349/95 |
| 2003/0231272 A1 * | 12/2003 | Nakamura et al. | 349/123 |
| 2004/0056991 A1 * | 3/2004 | Kashima | 349/89 |
| 2004/0188653 A1 * | 9/2004 | Kataoka et al. | 252/299.01 |

FOREIGN PATENT DOCUMENTS

| | | |
|---|---|---|
| JP | 5-232465 | 9/1993 |
| JP | 8-036186 | 2/1996 |
| JP | 8-338993 | 12/1996 |
| JP | 11-095221 | 4/1999 |
| JP | 11095221 A * | 4/1999 |
| JP | 2000-098393 | 4/2000 |
| JP | 2000-221480 | 8/2000 |
| JP | 2002-258303 | 9/2002 |
| JP | 2004-004329 | 1/2004 |
| JP | 2004-061748 | 2/2004 |
| JP | 2004-184846 | 7/2004 |
| JP | 2004-302061 | 10/2004 |
| KR | 2003-0094063 | 12/2003 |

* cited by examiner

*Primary Examiner* — Shean C Wu
(74) *Attorney, Agent, or Firm* — Kratz, Quintos & Hanson, LLP

(57) ABSTRACT

A liquid crystal display device which is capable of further decreasing the cost of production yet obtaining a good liquid crystal alignment, and a method of producing the same. The liquid crystal display device comprises a pair of substrates arranged facing each other; a liquid crystal sealed between the substrates; and an ultraviolet ray-cured product for controlling the alignment of the liquid crystal. The ultraviolet ray-cured product is formed near the interfaces to the substrates by polymerizing a polymerizable component mixed in the liquid crystal with light. The polymerizable component contains a polyfunctional monomer having a symmetrical structure, and the ultraviolet ray-cured product has a side-chain structure.

12 Claims, 16 Drawing Sheets

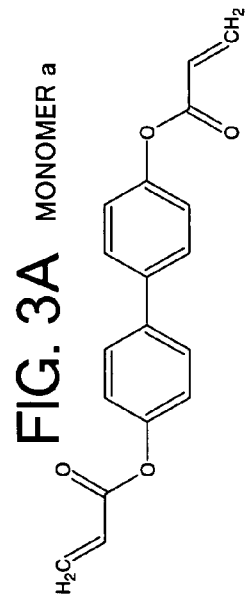
FIG. 3A MONOMER a
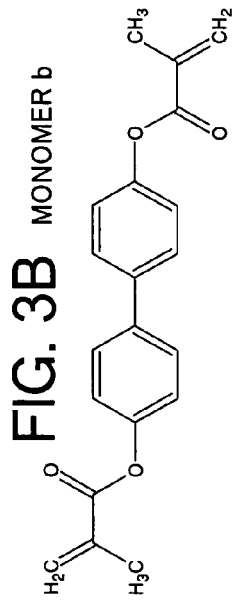
FIG. 3B MONOMER b
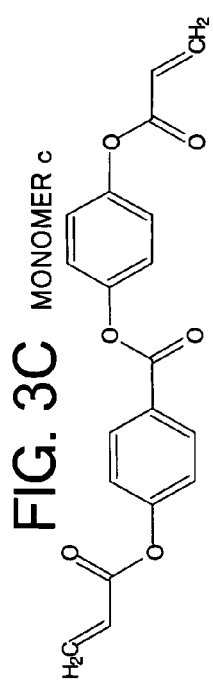
FIG. 3C MONOMER c
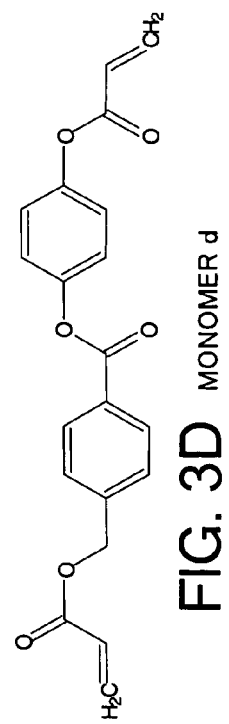
FIG. 3D MONOMER d
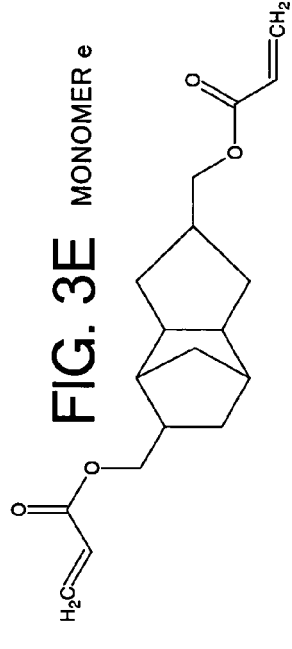
FIG. 3E MONOMER e
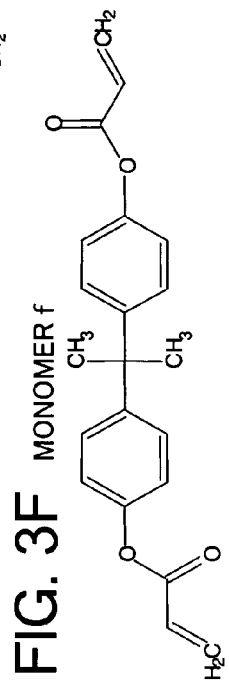
FIG. 3F MONOMER f
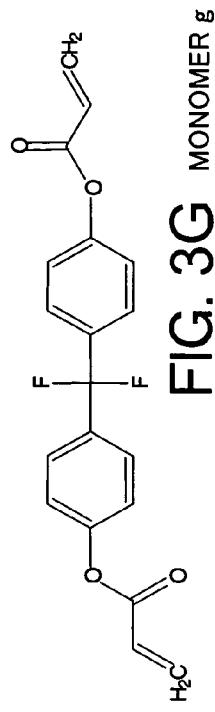
FIG. 3G MONOMER g
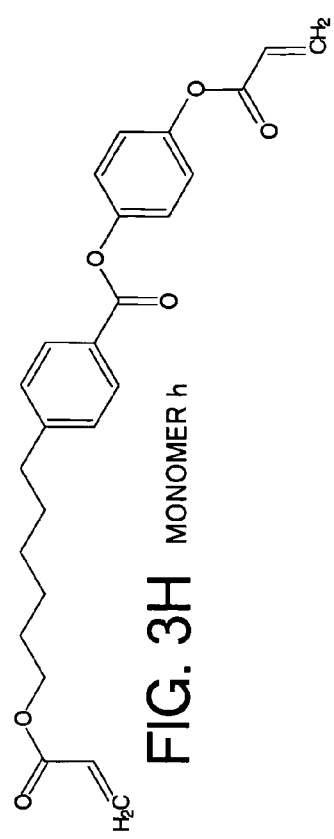
FIG. 3H MONOMER h

FIG. 4A
MONOMER i $$CH_2=CHCOO-C_9H_{18}-OCOCH=CH_2$$

FIG. 4B
MONOMER j $$CH_2=\underset{CH_3}{C}COO-C_4H_8-OCO\underset{CH_3}{C}=CH_2$$

FIG. 4C
MONOMER k $$CH_2=CHCOO-CH_2CH_2\underset{CH_3}{CH}CH_2CH_2-OCOCH=CH_2$$

PRODUCTION TIME

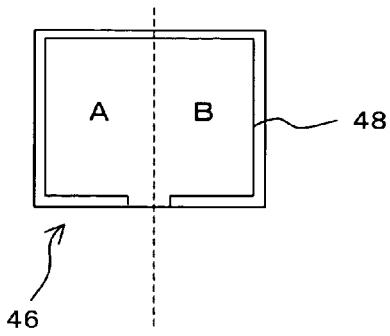
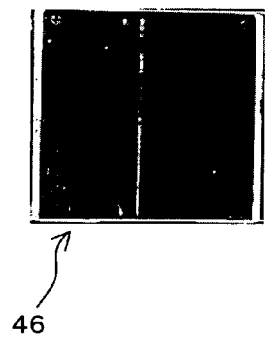
FIG. 12A          FIG. 12B
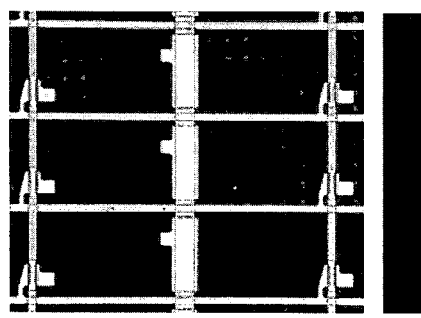
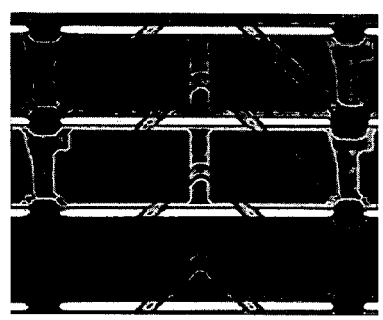
FIG. 16A          FIG. 16B          FIG. 16C

FIG. 21
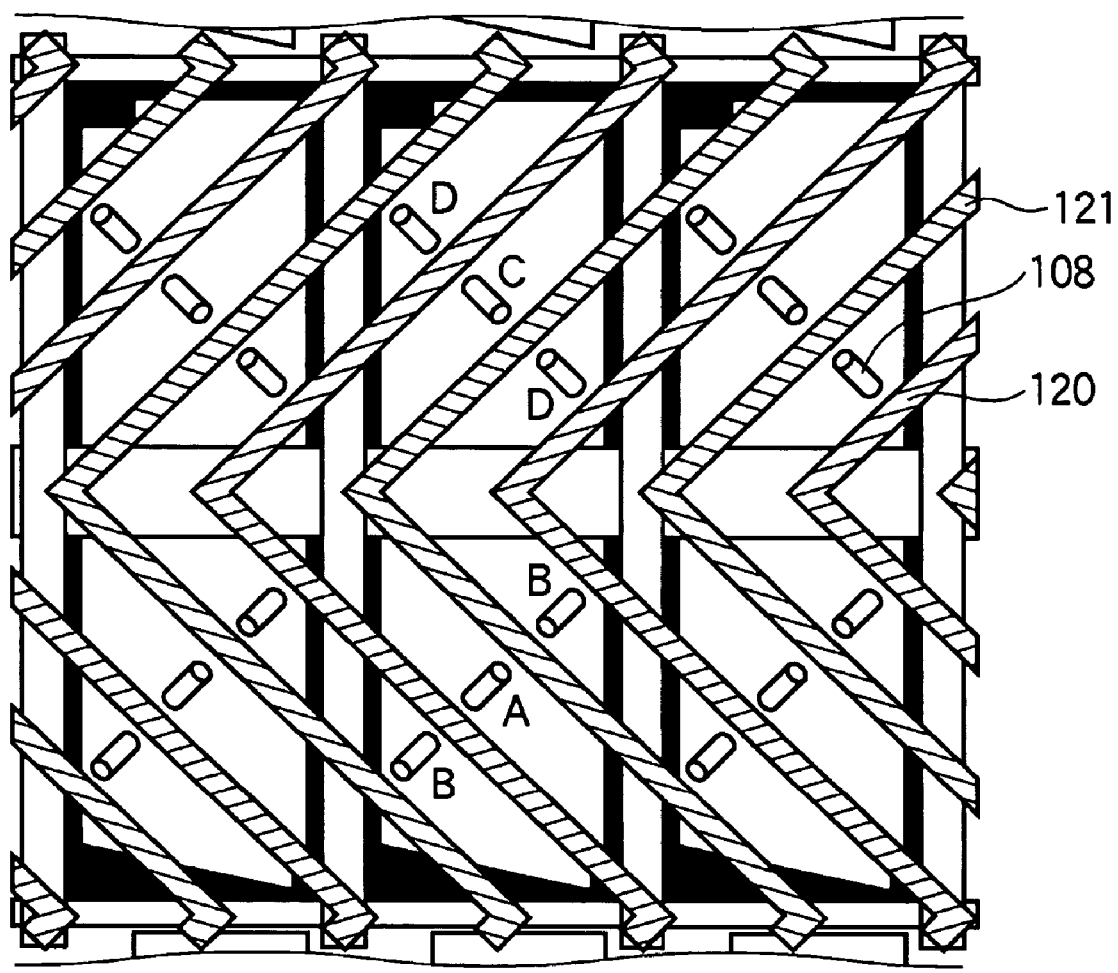
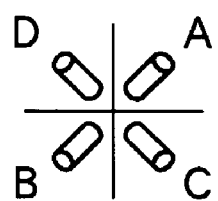
DIRECTIONS OF DOMAINS

LIQUID CRYSTAL DISPLAY DEVICE AND METHOD OF PRODUCING THE SAME

The subject matter of the present application was made by or on behalf of the following parties to a Joint Research Agreement within the meaning of 35 U.S.C. §103(c)(3):
 a. Fujitsu Display Technologies Corporation, which was a wholly owned subsidiary of Fujitsu Limited of 1-1, Kamikodinaka 4-Chome, Nakahara-ku, Kawasaki-shi, Kanagawa, Japan 211-8588; and
 b. AU Optronics Corporation of No. 1 Li-Hsin Road 2, Science-Based Industrial Park, Hsinchu 300, Taiwan, R.O.C.

BACKGROUND OF THE INVENTION

1. Field of the Invention

The present invention relates to a liquid crystal display device and a method of producing the same. More particularly, the invention relates to a liquid crystal display device of the type of vertical alignment in which the liquid crystal molecules are aligned nearly vertically to the surfaces of the substrates when no voltage is applied and a method of producing the same.

2. Description of the Related Art

As the active matrix type liquid crystal display device (LCD), there has heretofore been widely used a liquid crystal display device of a TN (twisted nematic) mode in which a liquid crystal material having a positive dielectric anisotropy is aligned horizontally to the substrate surfaces and being twisted by 90 degrees between the opposing substrates. However, the liquid crystal display device of the TN mode is accompanied by a problem of poor viewing angle characteristics, and study has been conducted extensively to improve the viewing angle characteristics.

There has further been developed a liquid crystal display device of the MVA (multi-domain vertical alignment) system in which a liquid crystal material having a negative dielectric anisotropy is vertically aligned and the tilt directions of the liquid crystal molecules when a voltage is applied are regulated by the protrusions and slits formed on and in the surfaces of the substrates to substitute for the system of the TN mode. The liquid crystal display device of the MVA system features a great improvement in the viewing angle characteristics.

A liquid crystal display device of a general MVA system will be described with reference to FIGS. 20 and 21. FIG. 20 is a schematic perspective view illustrating, in cross section, the liquid crystal display device of the MVA system, and FIG. 21 is a schematic view illustrating the constitution of three pixels in the liquid crystal display device of the MVA system and the direction of alignment of the liquid crystal molecules. In the liquid crystal display device of the MVA system as shown in FIGS. 20A and 20B, the liquid crystal molecules 108 of the liquid crystal material having the negative dielectric anisotropy are aligned nearly vertically to the substrate surfaces between the two pieces of glass substrates 110 and 111. Though not shown, a pixel electrode connected to a thin-film transistor (TFT) is formed for each pixel region on one glass substrate 110, and a common electrode is formed on the whole surface of the other glass substrate 111. Protrusions 120 are formed on the pixel electrode, and protrusions 121 are formed on the common electrode. The protrusions 120 and 121 are alternately arranged. A vertical alignment film that is not shown is formed on the pixel electrodes, common electrode and protrusions 120 and 121.

When the TFT is turned off and no voltage is applied to the liquid crystal molecules 108, the liquid crystal molecules 108 are aligned nearly vertically to the substrate interfaces as shown in FIG. 20A. When the TFT is turned on, a predetermined voltage is applied to the liquid crystal molecules 108 whereby the tilt directions of the liquid crystal molecules 108 are regulated by the structure of the protrusions 120 and 121. Therefore, the liquid crystal molecules 108 are aligned in a plurality of directions as shown in FIG. 20B. For example, when the protrusions 120 and 121 are formed as shown in FIG. 21, the liquid crystal molecules 108 are aligned in four directions A, B, C and D respectively in each pixel. As described above, the liquid crystal display device of the MVA system offers good viewing angle characteristics since the liquid crystal molecules 108 are aligned in a plurality of directions in each pixel when the TFT is turned on.

In the liquid crystal display device of the MVA system, the tilt directions of the liquid crystal molecules 108 are not regulated by the alignment film. Therefore, the MVA system requires no step of alignment treatment such as rubbing that is essential in the horizontally aligned system as represented by the one of the TN mode. This eliminates the problem of static electricity and dust caused by rubbing, and offers an advantage in the process such as eliminating the washing step after the alignment treatment. Another advantage is the display quality without developing the display unevenness that stems from the dispersion in the pre-tilt. As described above, the liquid crystal display device of the MVA system offers such features as simplified production process, improved yield of production bringing about a decrease in the cost, and a high display quality.

However, even the liquid crystal display device of the MVA system that does not require rubbing must be coated with an alignment film. Due to the irregular film thickness and infiltration of foreign matter in the step of printing the alignment film, therefore, the yield of production decreases, the cost of members increases and the tact time lengthens. As described above, the conventional liquid crystal display device of the MVA system still involves a problem of an increase in the cost of production due to the step of printing the alignment film.

In recent years, further, the mother glasses of very large sizes have been produced in response to an increase in the size of the liquid crystal display devices. However, the device for printing the alignment film cannot be easily modified to respond to the mother glasses of very large sizes. In recent years, further, there have been used substrates of the form of thin and flexible films and substrates of shapes that are not flat but are bent. It is quite difficult to print the alignment film on these substrates. Therefore, the liquid crystal display devices using the mother glasses of large sizes and substrates of special shapes are accompanied by a problem of difficulty in obtaining a good liquid crystal alignment.

Patent document 1: JP-A-11-95221
Patent document 2: JP-A-5-232465
Patent document 3: JP-A-8-338993
Patent document 4: JP-A-8-36186

SUMMARY OF THE INVENTION

It is an object of the present invention to provide a liquid crystal display device which is capable of further decreasing the cost of production yet obtaining a good liquid crystal alignment, and a method of producing the same.

It is another object of the present invention to provide a liquid crystal display device capable of obtaining a good liquid crystal alignment despite of the use of a mother glass of a large size and a substrate of a special shape, and a method of producing the same.

The above objects are achieved by a liquid crystal display device comprising:

a pair of substrates arranged facing each other;

liquid crystals sealed between the pair of substrates; and a photo-cured product having a side chain structure for controlling the alignment of the liquid crystals, the photo-cured product being formed near the interfaces to the pair of substrates upon polymerizing a polymerizable component containing a polyfunctional monomer having a symmetrical structure mixed in the liquid crystals with light.

According to the invention, a liquid crystal display device at a further decreased cost of production yet maintaining a good liquid crystal alignment can be realized. Further, according to the invention, a liquid crystal display device capable of maintaining a good liquid crystal alignment despite of the use of a mother glass of a large size and substrates of a special shape can be realized.

BRIEF DESCRIPTION OF THE DRAWINGS

FIGS. 3A through 3H are diagrams illustrating bifunctional monomers used for the liquid crystal display device according to Example 1-1 of the first embodiment of the invention;

FIGS. 4A through 4C are diagrams illustrating bifunctional monomers used for the liquid crystal display device according to Example 1-2 of the first embodiment of the invention;

FIGS. 12A and 12B are views comparing the states of alignment by the ultraviolet ray-cured products formed by using the light sources A and B;

FIGS. 16A through 16C are views illustrating a structure formed on the glass substrate;

FIG. 21 is a schematic view illustrating the constitution of three pixels in the liquid crystal display device of the MVA system and the directions of alignment of the liquid crystal molecules.

DESCRIPTION OF THE PREFERRED EMBODIMENTS

First Embodiment

Figure 1A:
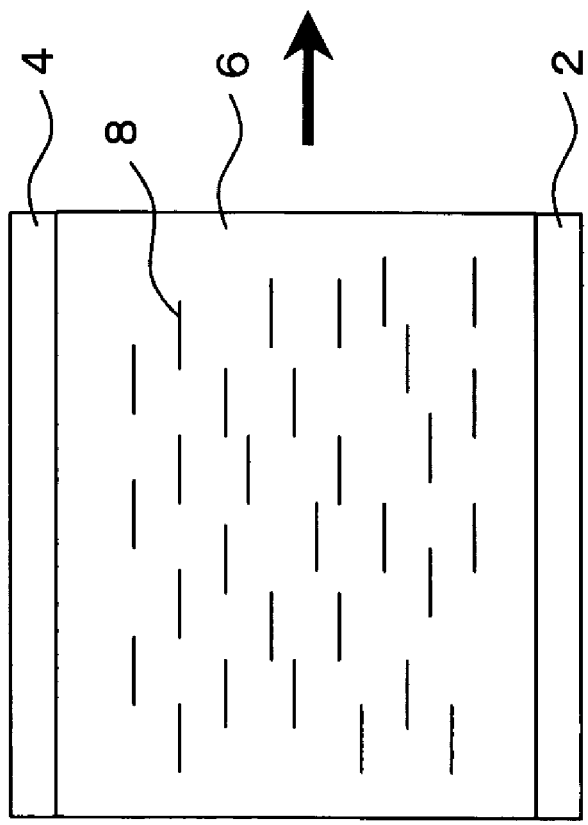
FIGS. 1A and 1B are views schematically illustrating the constitution of a liquid crystal display device and a method of its production according to a first embodiment of the invention.
Figure 1B:
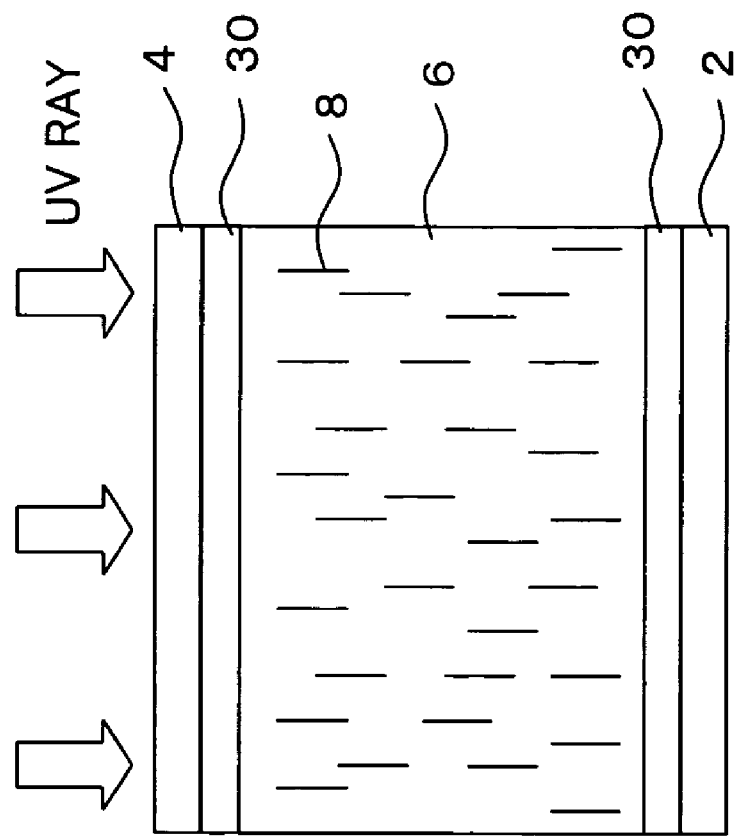

A liquid crystal display device and a method of its production according to a first embodiment of the invention will now be described with reference to FIGS. 1 to 9. FIG. 1 schematically illustrates the constitution of a liquid crystal display device and a method of its production according to the embodiment. Referring, first, to FIG. 1A, liquid crystal layer 6 into which a polymerizable component is mixed and having a negative dielectric anisotropy are sealed between a pair of substrates 2 and 4. In this embodiment, the substrates 2 and 4 have not been coated with a vertical alignment film. Therefore, the liquid crystal molecules 8 in this step are aligned nearly in parallel with the substrate surfaces. Referring next to FIG. 1B, the liquid crystal layer 6 are irradiated with an ultraviolet ray (or visible ray) to polymerize the polymerizable component. The polymerizable component contains a polyfunctional monomer having a symmetrical structure. Therefore, an ultraviolet ray-cured product (photo-cured product) 30 of a system containing the polyfunctional monomer having the symmetrical structure is formed near the interfaces to the substrates 2 and 4. The ultraviolet ray-cured product 30 has a function for regulating the alignment of the liquid crystal layer 6, and the liquid crystal molecules 8 are aligned nearly vertically to the substrate surfaces.

The alignment of the liquid crystal layer 6 can be controlled even by using a polyfunctional monomer without symmetrical structure as a polymerizable component. To obtain reliability in the electrical characteristics of a level same as that of the general alignment films (initial voltage-holding ratio, magnitude of the residual DC value, deterioration of these characteristics after left to stand for extended periods of time), however, it was found that the symmetry in the structure of the polyfunctional monomer plays a very important role.

Here, when constituted by, for example, the atoms A, B and C, the phrase "having the symmetrical structure" stands for such a structure that has "CCABBCBBACC" or "CABBC-CBBAC". The former structure is symmetrical with the central "C" as a reference, and the latter structure is symmetrical with the central "CC" as a reference. Further, "having the symmetrical structure" can be stated even when the structure is branched and the state represented by the following formula (1),

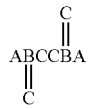

remains stable in terms of energy.

Further, to favorably control the alignment of the liquid crystal molecules 8 in a direction vertical to the substrate surfaces, the ultraviolet ray-cured product 30 formed on the interfaces of the substrates must have a side chain structure on the side of the liquid crystal layer 6. A concrete side chain structure may be an alkyl group or an alkoxyl group.

As described above, the liquid crystal display device featuring excellent reliability and good liquid crystal alignment is realized upon satisfying the two conditions in that the ultraviolet ray-cured product 30 (1) comprises a system containing a polyfunctional monomer having a symmetrical structure, and (2) has a side chain structure.

Next, described below is a region of wavelengths of light irradiated for forming the ultraviolet ray-cured product 30. Even when the electrically stabilized ultraviolet ray-cured product 30 is formed, the display device cannot maintain reliability if the liquid crystal layer 6 are deteriorated in the step of its formation. In order to prevent the liquid crystal layer 6 from deteriorating, it was learned through experiment that it is better to irradiate with the ultraviolet ray cutting off the region of short wavelengths which are shorter than 310 nm by using a filter. It is further desired that the ultraviolet ray at a wavelength of 310 nm has an intensity of not larger than 0.1 mW/cm². If the intensity at the wavelength of 310 nm is set to be completely zero, however, it becomes difficult to obtain a desired liquid crystal alignment. It is therefore desired to use a light source which has the intensity at the wavelength of 310 nm of about 0.02 to about 0.05 mW/cm².

It is further desired that the monomer material, too, has a structure that can be reacted with light in the wavelength region of not shorter than 310 nm. The reactivity can be improved even by adding the photo-initiating agent. However, a high reliability can be easily obtained if the monomer by itself can be reacted with the liquid crystal layer 6 as a solvent. To obtain a high reactivity for light, it was learned that the monomer is desirably a cyclic compound including a cyclic structure and, particularly, contains a benzene ring as a ring structure.

The state where the liquid crystal layer 6 are aligned after irradiated with the ultraviolet rays varies depending upon the structure of the alkyl skeleton and is, further, affected by the structure of the polyfunctional monomer. Concretely speaking, it was learned that the liquid crystal alignment proceeds in a good direction upon using a polyfunctional monomer having a bent molecular structure instead of the rod-like molecular structure. The word "rod-like" referred to here stands for that the main skeletal portion from which the photofunctional group such as acrylate group or methacrylate group is removed, is linear. The rod-like molecular structure may be a biphenyl skeleton in which two benzene rings are directly bonded together or an alkyl skeleton in which the individual molecules are bonded in a zigzag manner without having benzene ring. This, however, is included in the bent molecular structure when it is bent in a "<"-shape in terms of energy due to a long-chain alkyl skeleton having not less than 20 carbon atoms.

It is desired that the bifunctional monomer has a structure represented by the following chemical formula (2) when it has a symmetrical structure, is capable of being reacted in the liquid crystal layer 6 with light of a region of relatively long wavelengths of not shorter than 310 nm, and has a bent molecular structure,

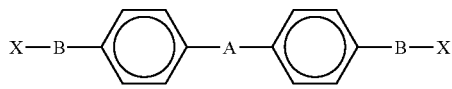

where X is an acrylate group or a methacrylate group,
A represents the chemical formula (3),

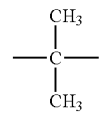

the chemical formula (4),

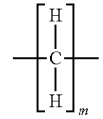

or the chemical formula (5),

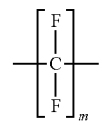

B represents the chemical formula (6),

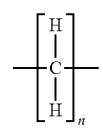

or the chemical formula (7),

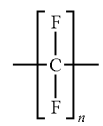

and m and n are 0 or integers of not smaller than 1.

Here, the bifunctional monomer (m=0) without A has no bent molecular structure and tends to exhibit decreased alignment and a decreased compatibility to the liquid crystal layer 6. Even by using the bifunctional monomer without A, however, there can be realized a liquid crystal display device having excellent reliability. From the standpoint of reactivity and alignment, further, it is desired that m and n are not larger than 1.

Even if the ultraviolet ray-cured product 30 is formed by using these materials on the interfaces of the substrates, it does not mean that the liquid crystal display device having excellent reliability is realized under all conditions. It was learned that the electrical characteristics of the liquid crystal layer 6 after the ultraviolet ray-cured product 30 is formed greatly vary depending upon the reaction ratio of the polyfunctional monomer having the symmetrical structure. That is, the ultraviolet ray-cured product 30 must contain the polyfunctional monomer having the symmetrical structure to a sufficient degree. Conversely, if the polyfunctional monomer is consumed to a sufficient degree to form the ultraviolet ray-cured product 30, it was found that the electric characteristics are affected very little even if there remains to some extent the monofunctional monomer without having the symmetrical structure that contains the alkyl skeleton.

Concretely speaking, it is important that after the ultraviolet ray-cured product 30 has been formed, the ratio of the polyfunctional monomer having the symmetrical structure is not larger than 20% on the weight basis relative to the total amount of the unreacted monomers remaining in the liquid crystal layer 6. It is further desired that the polyfunctional monomer having the symmetrical structure is consumed to a degree that it is not almost detected.

In this embodiment as shown in FIG. 1A, the liquid crystal molecules 8 of before being irradiated with ultraviolet rays are aligned nearly horizontally to the substrate surfaces and in a random fashion in the direction of the azimuth angle. Here, when the ultraviolet ray-cured product 30 is formed and the liquid crystal molecules 8 are aligned nearly vertically to the substrate surfaces, the liquid crystal layer 6 often remain being horizontally aligned in the region where abnormal alignment (disclination) has took place before the ultraviolet ray-cured product 30 is formed or while the ultraviolet ray-cured product 30 is being formed. The abnormal alignment accounts for the occurrence of display shading or a drop in the contrast.

Figure 2B:
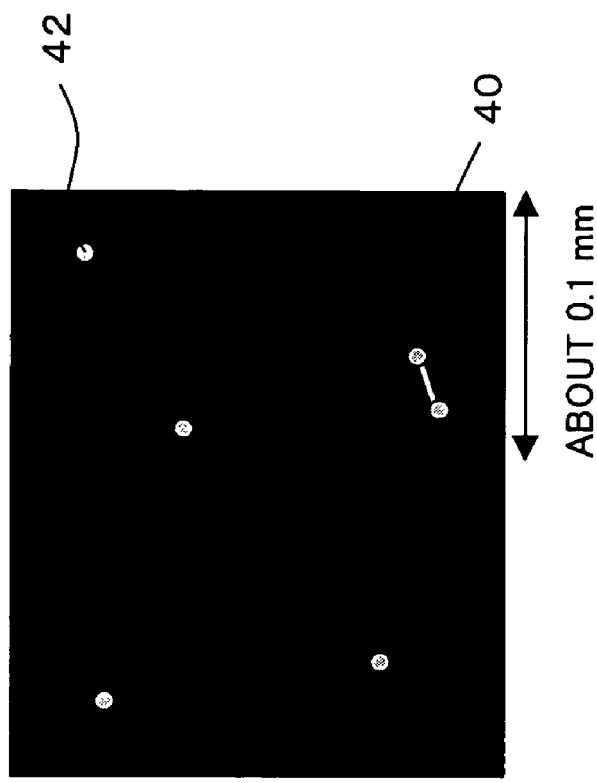
FIGS. 2A and 2B are views illustrating a state where the liquid crystal display device developing abnormal alignment is viewed perpendicularly to the surfaces of the substrates.
Figure 2A:
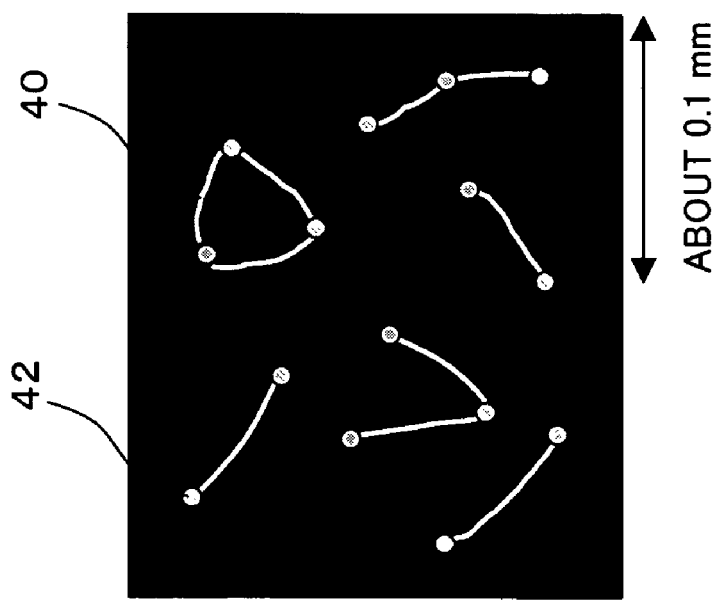

FIG. 2A illustrates a state where the liquid crystal display device developing the abnormal alignment is viewed perpendicularly to the substrate surfaces. Referring to FIG. 2A, the abnormal alignment occurs being triggered by bead spacers 42 sprinkled among the substrates or by the ruggedness of the substrate surfaces as nuclei, and is visually perceived as white lines 40 due to the leakage of light. The abnormal alignment will extinguish spontaneously if it is left to stand. However, the abnormal alignment formed across narrow bead spacers 42 is stable and remains. Referring to FIG. 2B, if the bead spacers 42 are sprinkled lowly densely, the average gap among the bead spacers 42 is widened suppressing the occurrence of stable abnormal alignment that is visually perceived as white lines 40. However, it is very difficult to homogeneously sprinkle the bead spacers 42, and the occurrence of abnormal alignment cannot be completely prevented. In this embodiment, therefore, the cell thickness is maintained relying upon the column protuberances (column spacers) formed on the substrate maintaining a given gap by the photolithography method instead of forming bead spacers 42, to suppress, from the structural aspect, the abnormal alignment that tends to remain stably.

Further, this embodiment exhibits the advantage to a maximum degree when it is combined with a drop-injection method. When the liquid crystals into which the monomer is mixed are injected into a large panel by the conventional dip-type vacuum injection, abnormal alignment takes place at the end opposed to the liquid crystal injection port due to the distribution of the monomer and is visually perceived as display shading.

When the liquid crystals are dropped onto the substrate forming the alignment film by the drop-injection method, on the other hand, a problem occurs in that traces of liquid droplets (dropping traces) tend to be formed at places where the liquid crystals are dropped. In this embodiment, however, no alignment film has been formed on the substrates. Therefore, the dropping traces are formed very little even when the drop-injection method is used.

According to the conventional panel steps, a production line had to be built up by installing three apparatuses such as an alignment film-printing apparatus, a substrate-sticking apparatus and a liquid crystal injection apparatus. Upon combining this embodiment with the drop-injection method, however, the above three apparatuses can be replaced by only one drop-injection apparatus. Therefore, the liquid crystal display device featuring excellent reliability can be produced through a simple production line at a low cost. In this embodiment, further, there is no need of printing the alignment film. Therefore, a good liquid crystal alignment is obtained even in a liquid crystal display device which is fabricated by using a mother glass of a large size, a thin and flexible film-like substrate and a substrate which is not flat but is bent.

A liquid crystal display device and a method of its production according to the embodiment will now be concretely described by way of Examples.

EXAMPLE 1-1

A lauryl acrylate was dissolved at a mass mol concentration of $1.3 \times 10^{-4}$ mols/g in the negative-type liquid crystals A manufactured by Merck Ltd. Next, a bifunctional monomer was dissolved at a concentration of $1.3 \times 10^{-5}$ mols/g which was one-tenth of the above mass mol concentration in the liquid crystals in which the lauryl acrylate had been dissolved to prepare mixed liquid crystals. Eight kinds of bifunctional monomers a to h shown in FIGS. 3A to 3H were used to prepare eight kinds of mixed liquid crystals. Further, pairs of glass substrates forming electrodes of ITO were so stuck together that the cell thickness was 4.25 μm thereby to prepare a plurality of empty cells. No alignment film was formed on the two glass substrates. Next, the eight kinds of mixed liquid crystals were injected into the empty cells respectively and were sealed to prepare eight kinds of evaluation cells. Thereafter, the mixed liquid crystals of the evaluation cells were irradiated with an ultraviolet ray without polarization. The intensity of the ultraviolet ray irradiation was 1 mW/cm$^2$, and the irradiation energy was 9000 mJ/cm$^2$.

The states of liquid crystal alignment of the eight kinds of evaluation cells were observed and their voltage-holding ratios were measured. The states of alignment were observed by arranging a pair of polarizing plates in cross nicol on the outer side of the evaluation cells and projecting the light from the rear side. The results were as shown in Table 1.

TABLE 1

| Monomer | White line | Voltage-holding ratio | Display shading |
|---------|------------|----------------------|-----------------|
| a | Δ | up to 99.5% | ○ |
| b | Δ | up to 99.5% | ○ |
| c | Δ | up to 98.5% | Δ |
| d | Δ | up to 97.0% | X |
| e | ○ | up to 96.5% | X |
| f | ○ | up to 99.5% | ○ |

TABLE 1-continued

| Monomer | White line | Voltage-holding ratio | Display shading |
|---|---|---|---|
| g | ○ | up to 99.5% | ○ |
| h | X | up to 96.0% | X |

The column of "white line" in Table 1 shows the evaluation of the states of alignment in three levels; i.e., (O) white lines are not visually perceived substantially, (Δ) white lines are visually perceived to some extent and (X) white lines appear conspicuously. The column of "display shading" shows the evaluation of the states of alignment in three levels; i.e., (O) display shading is not visually perceived substantially, (Δ) display shading is visually perceived when the drive frequency is lowered and (X) display shading is visually perceived even at a drive frequency of 60 Hz.

Concerning the voltage-holding ratios as shown in Table 1, the evaluation cells are divided into two groups, i.e., those which have high voltage-holding ratio and those which have low voltage-holding ratio. The evaluation cells using the bifunctional monomers a, b, f and g having the symmetrical structure exhibited high voltage-holding ratios. Before being irradiated with the ultraviolet rays, the liquid crystals in all the evaluation cells were horizontally aligned in a random fashion in the direction of the azimuth angle. After irradiated with the ultraviolet ray, however, the liquid crystals in all the evaluation cells were vertically aligned. However, white lines appeared conspicuously in some evaluation cells and white lines were not visually perceived substantially in some evaluation cells. Summarizing these tendencies, white lines were visually perceived generally in the evaluation cells that used the bifunctional monomers a, b and h having the rod-like molecular structure. It was learned that among them, white lines were visually perceived to some extent in the evaluation cells using bifunctional monomers a and b to which two benzene rings were directly bonded, and white lines appeared conspicuously in the evaluation cell using the bifunctional monomer h including a long-chain alkyl structure. On the other hand, white lines were not visually perceived substantially in the evaluation cells using the bifunctional monomers f and g having a bent molecular structure and in the evaluation cell using the bifunctional monomer e having a stereostructure. However, in the evaluation cell using the bifunctional monomer e, the display shading was visually perceived due to a low voltage-holding ratio.

EXAMPLE 1-2

A lauryl acrylate was dissolved at a mass mol concentration of $1.3 \times 10^{-4}$ mols/g in the negative-type liquid crystals A manufactured by Merck Ltd. Next, a bifunctional monomer was dissolved at a concentration of $1.3 \times 10^{-5}$ mols/g which was one-tenth of the above mass mol concentration in the liquid crystals in which the lauryl acrylate has been dissolved to prepare mixed liquid crystals. As the bifunctional monomers, there were used the monomer (a) shown in FIG. 3A and the monomers (i) to (k) shown in FIGS. 4A to 4C respectively to prepare four kinds of mixed liquid crystals. Further, a pair of glass substrates forming electrodes of ITO were stuck together so that the cell thickness was 4.25 μm thereby to prepare a plurality of empty cells. No alignment film was formed on the two glass substrates. Next, the four kinds of mixed liquid crystals were injected into the respective empty cells and were sealed to prepare evaluation cells in a plurality of numbers for each kind of the mixed liquid crystals. Thereafter, the mixed liquid crystals of the respective evaluation cells were irradiated with an ultraviolet ray without polarization. The mixed liquid crystals were irradiated with either the ultraviolet ray from which the short wavelength region of shorter than 310 nm has been cut by using a filter or the ultraviolet ray including the short wavelength region of shorter than 310 nm. The intensity was the same between the ultraviolet ray from which the short wavelength region has been cut and the ultraviolet ray including the short wavelength region in the wavelength region of not shorter than 310 nm, the intensity of the ultraviolet ray including the short wavelength region being about 0.01 to 0.03 mW/cm$^2$ in the wavelength region of about 250 to 300 mm.

The states of liquid crystal alignment of the evaluation cells were observed and their voltage-holding ratios were measured. The results were as shown in Table 2. In Table 2, the values marked with * show the greatest values among those measured since the dispersion was great for each of the evaluation cells.

TABLE 2

| | Vertical alignment | | Voltage-holding ratio | |
|---|---|---|---|---|
| Monomer | Short Wavelengths were cut | Short Wavelengths were not cut | Short Wavelengths were cut | Short Wavelengths were not cut |
| a | ○ | ○ | up to 99.5% | up to 87.5% |
| i | X | ○ | Smaller than 87.5%* | up to 86.0% |
| j | X | ○ | Smaller than 85.5%* | up to 79.0% |
| k | X | ○ | Smaller than 85.0%* | up to 83.5% |

As shown in Table 2, the evaluation cell using the bifunctional monomer a established the vertical alignment (represented by O in Table 2) either when it was irradiated with the ultraviolet ray from which the short wavelength region of shorter than 310 nm has been cut (short wavelengths were cut) or when it was irradiated with the ultraviolet ray including the short wavelength region of shorter than 310 nm (short wavelengths were not cut). On the other hand, the evaluation cells using the bifunctional monomers i, j and k established the vertical alignment only when they were irradiated with the ultraviolet ray including the short wavelength region of shorter than 310 nm. When irradiated with the ultraviolet ray including the short wavelength region, all of the evaluation cells exhibited the voltage-holding ratios of smaller than 90%. That is, favorable characteristics were not obtained with the evaluation cells using the bifunctional monomers i, j and k irrespective of whether they were irradiated with the ultraviolet ray including or not including short wavelength regions.

The evaluation cells using the bifunctional monomers i, j and k were examined to detect the residual monomer by using a gas chromatography. As a result, the monomer remaining ratios were not smaller than 95% in the evaluation cells irradiated with the ultraviolet ray from which the short wavelength region had been cut, and substantially no monomer were reacted. When the evaluation cells were irradiated with the ultraviolet ray including the short wavelength region, the monomers were remaining at ratios of about 80%; i.e., the monomers were reacted in slightly larger amounts. In the evaluation cell using the bifunctional monomer a, on the other hand, the monomer was remaining at a ratio of about 75% even when it was irradiated with the ultraviolet ray from which the short wavelength region had been cut; i.e., the monomer was reacted in relatively larger amounts.

EXAMPLE 1-3

A monofunctional monomer represented by the chemical formula (8),

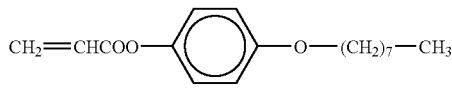

was dissolved at a mass mol concentration of $1.3 \times 10^{-4}$ mols/g in the negative-type liquid crystals A manufactured by Merck Ltd. Next, a bifunctional monomer a shown in FIG. 3A was dissolved at a concentration of $1.3 \times 10^{-5}$ mols/g which was one-tenth of the above mass mol concentration to prepare mixed liquid crystals. Further, a pair of glass substrates each forming electrodes of ITO were stuck together so that the cell thickness was 4.25 μm thereby to prepare a plurality of empty cells. No alignment film was formed on the two glass substrates. Next, the mixed liquid crystals were injected into the empty cells and were sealed to prepare evaluation cells. Thereafter, the mixed liquid crystals of the evaluation cells were irradiated with an ultraviolet ray without polarization. The intensity of the ultraviolet ray irradiation was 1 mW/cm², and the irradiation energy was 9000 mJ/cm².

Figure 5:
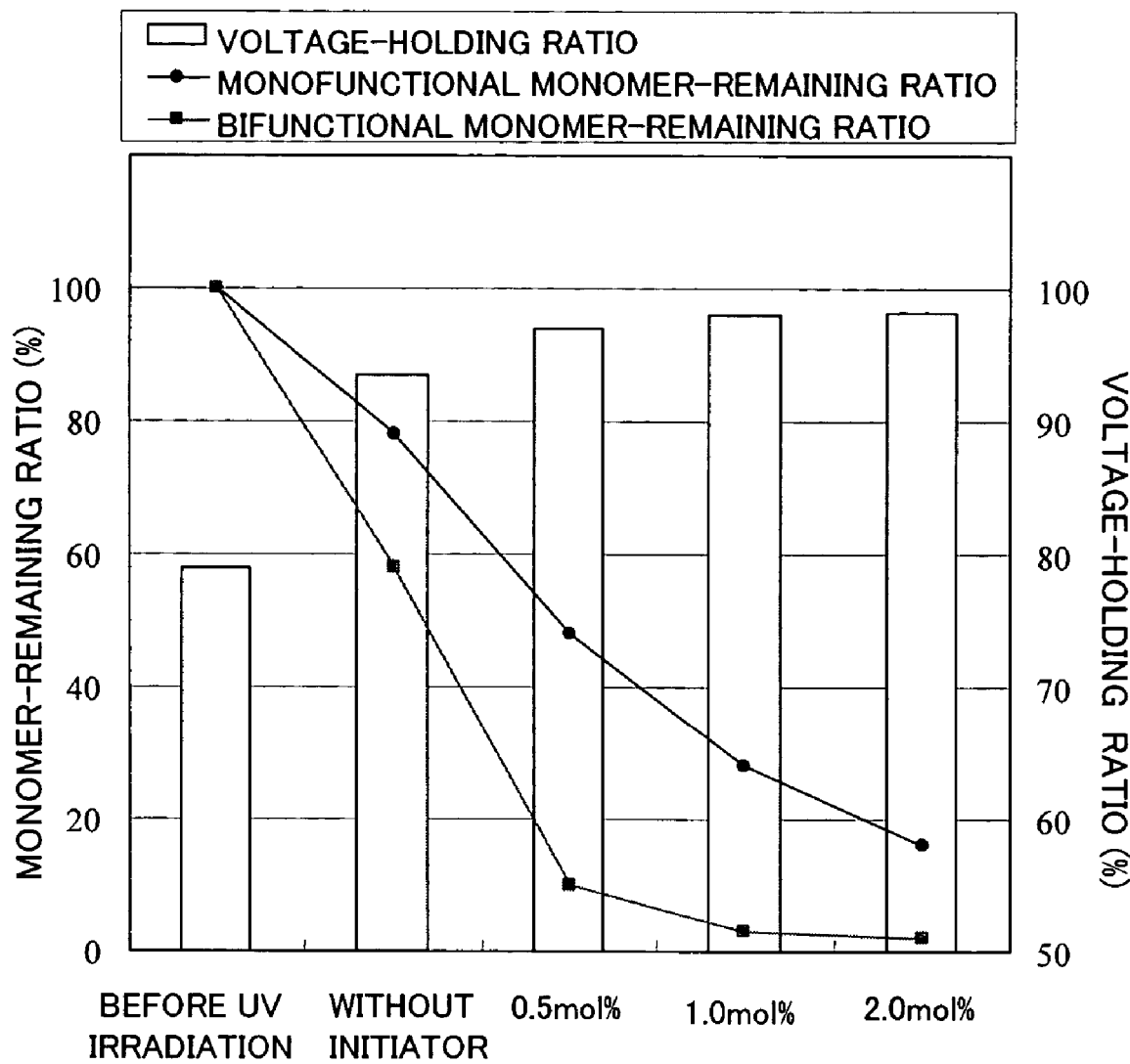
FIG. 5 is a graph illustrating a relationship between the monomer-remaining ratio and the voltage-holding ratio.

A relationship was found between the remaining ratios of the monofunctional monomer and that of the bifunctional monomer in the evaluation cells and the voltage-holding ratios. The results were as shown in FIG. 5 wherein the abscissa represents the evaluation cells of before being irradiated with the ultraviolet rays and a plurality of evaluation cells in which the reacting amounts of the monomer are varied by changing the amount (mol %) of addition of the polymerization initiator (Irgacure 651). The ordinate represents the monomer remaining ratio (%) and the voltage-holding ratio (%). A line connecting the black circles represents the remaining ratio of the monofunctional monomer, and a line connecting the black squares represents the remaining ratio of the bifunctional monomer. Here, the monomer-remaining ratios are those when the amount of the monofunctional monomer and amount of the bifunctional monomer contained in the evaluation cells of before being irradiated with the ultraviolet ray are 100%, respectively. The bars in the graph represent the voltage-holding ratios. The voltage-holding ratios have a holding period of 1.67 seconds. It will be learned from FIG. 5 that the voltage-holding ratio increases with the decrease in the monomer-remaining ratio, i.e., the voltage-holding ratio increases with an increase in the amount of reaction of the monomer. In this case, the voltage-holding ratio is saturated if the reaction of the bifunctional monomer proceeds by more than a certain degree and, thereafter, varies depending little upon the amount of reaction of the monofunctional monomer.

Figure 6:
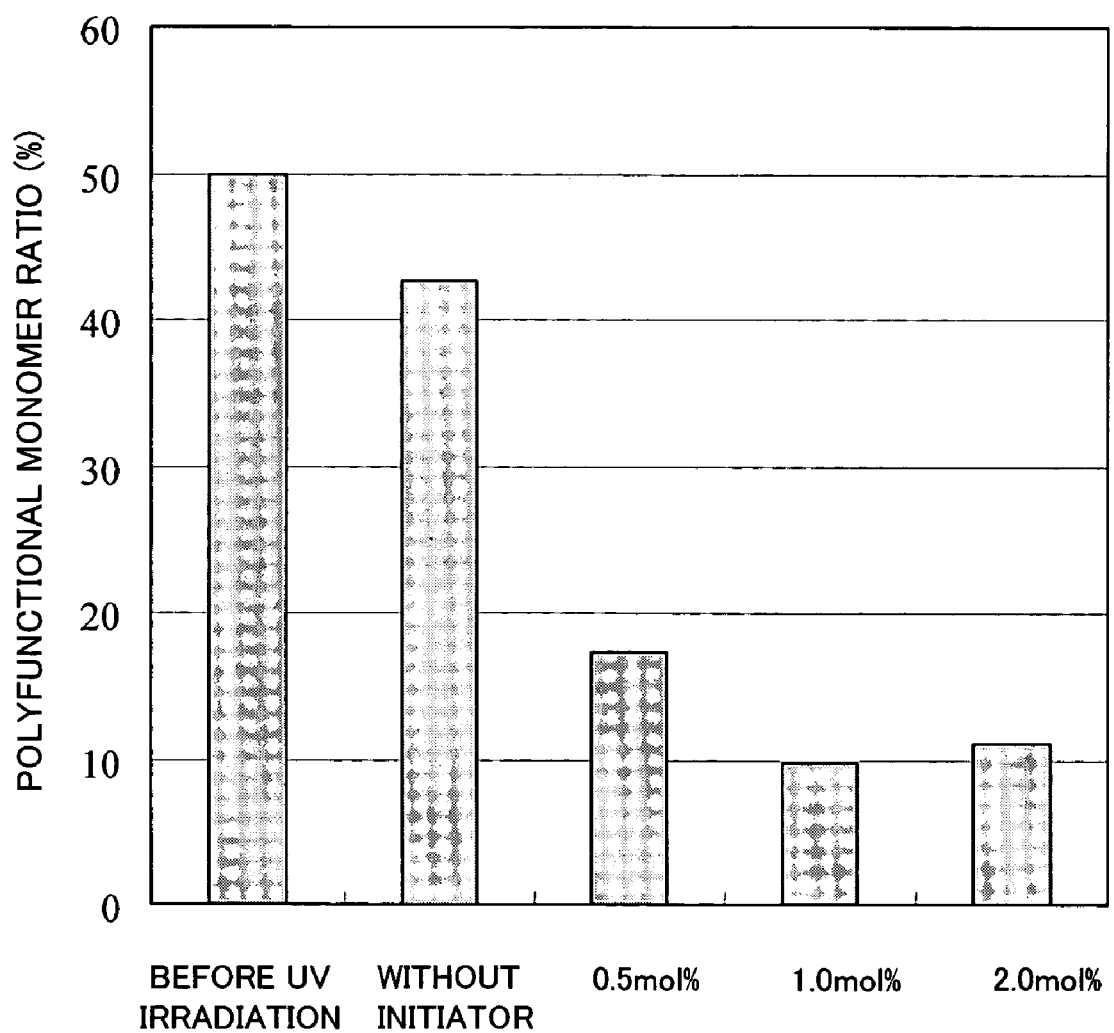
FIG. 6 is a graph illustrating a relationship between the amount of reaction of the monomer and the ratio of the polyfunctional monomer.

FIG. 6 shows the above results by using a different ordinate. The ordinate of FIG. 6 represents the ratio (weight ratio) of the polyfunctional monomer among the unreacted monomers remaining in the liquid crystals. It is learned from FIGS. 5 and 6 that to obtain favorable characteristics by saturating the voltage-holding ratio, it is desirable that the ratio of the polyfunctional monomers is not larger than 20% on the weight basis among those of the unreacted monomers remaining in the liquid crystals.

EXAMPLE 1-4

Figure 7:
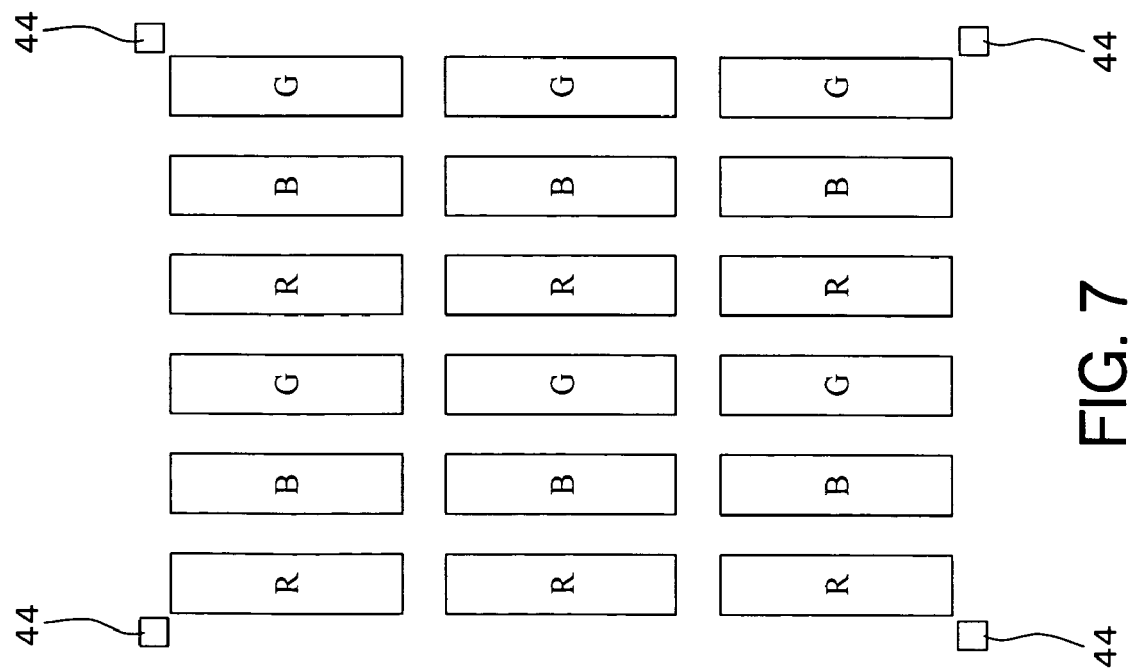
FIG. 7 is a diagram illustrating the arrangement of column spacers in the liquid crystal display device according to Example 1-4 of the first embodiment of the invention.

A 17-inch wide (1280×768 dot) TFT liquid crystal display panel of the MVA system was fabricated. Column spacers were formed on the substrates on the opposing sides to maintain the cell thickness. FIG. 7 illustrates the arrangement of column spacers on the opposing substrates. As shown in FIG. 7, the column spacers 44 were arranged at a density of 1 for every 18 pixels. As the liquid crystal material, the monomer-mixed liquid crystals same as those of Example 1-3 were used, and the ultraviolet ray without polarization was irradiated at an intensity of 1 mW/cm² with an irradiation energy of 9000 mJ/cm².

Further, a liquid crystal display panel was fabricated in the same manner as described above but dispersing the bead spacers in a customary manner instead of forming the column spacers.

Figure 8A:
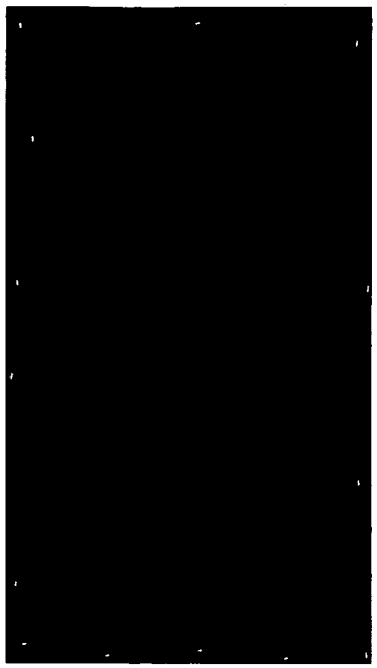
FIGS. 8A and 8B are views schematically illustrating a display screen of the liquid crystal display device according to Example 1-4 of the first embodiment of the invention.
Figure 8B:
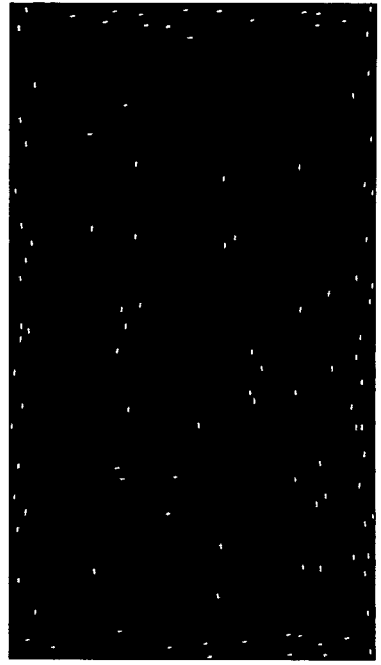

The states of liquid crystal alignment of the two pieces of liquid crystal display panels were observed. FIG. 8 schematically illustrates display screens of the liquid crystal display panels. FIG. 8A illustrates a display screen of the liquid crystal display panel using the spacers, and FIG. 8B illustrates a display screen of the liquid crystal display panel using the bead spacers. As shown in FIGS. 8A and 8B, the vertical alignment was obtained in the two liquid crystal display panels. In the liquid crystal display panel using the bead spacers as shown in FIG. 8B, however, white lines were scattered on the whole screen as shown in FIGS. 2A and 2B.

EXAMPLE 1-5

Figure 9:
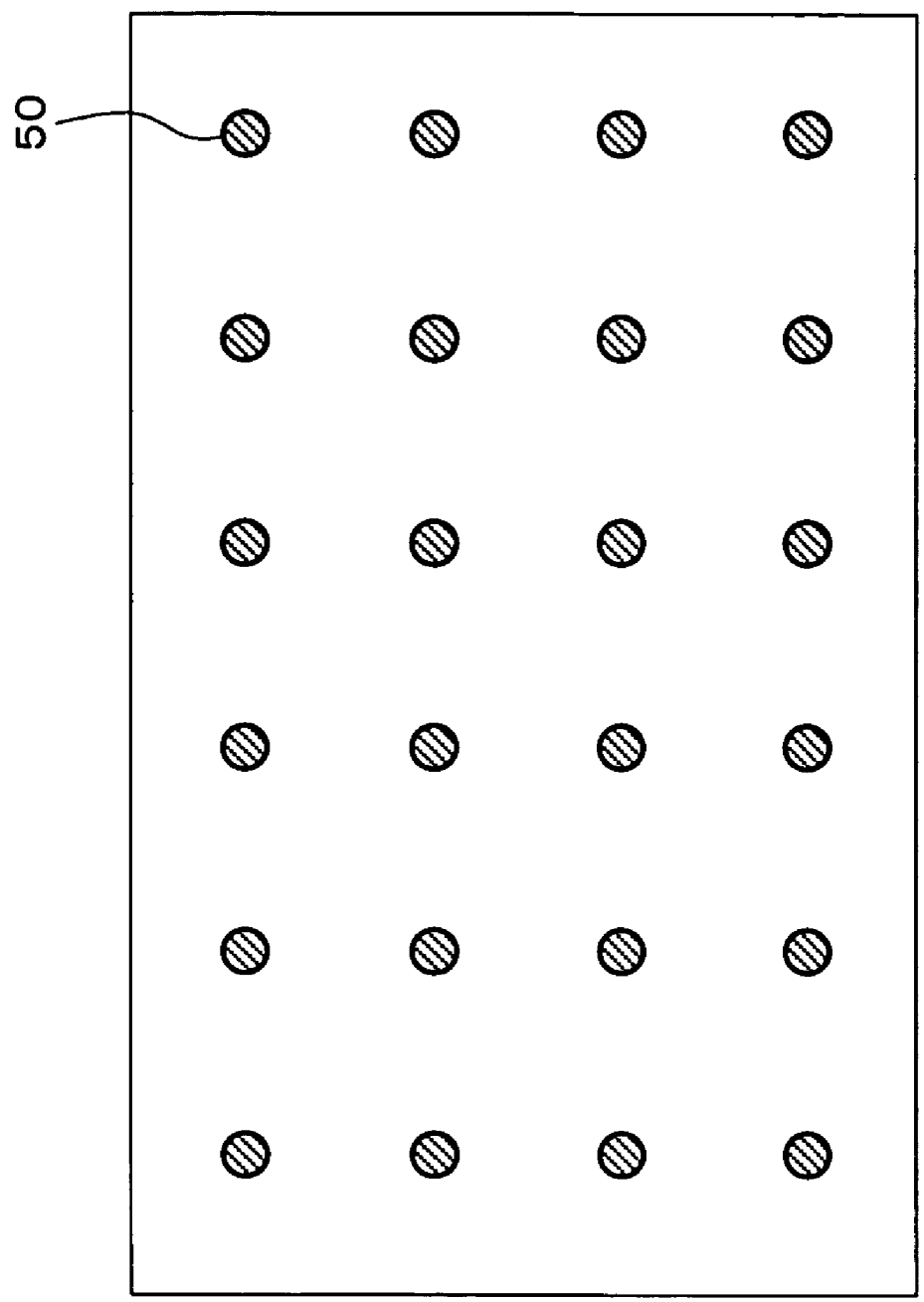
FIG. 9 is a view illustrating the dropping traces of a conventional liquid crystal display panel fabricated by the drop-injection method.

A vertical alignment film manufactured by JSR Co. was printed on both substrates, and the negative-type liquid crystals A manufactured by Merck Ltd. was filled by the drop-injection method to fabricate a 17-inch wide (1280×768 dots) TFT liquid crystal display panel of the MVA mode. When a halftone display was performed, a display unevenness (dropping traces) 50 as shown in FIG. 9 were observed at the positions where the liquid crystals were dropped.

Next, a similar TFT liquid crystal display panel was fabricated by filling the same monomer-mixed liquid crystals as those of Example 1-3 by the drop-injection method but without printing the alignment films. In the initial state, the liquid crystals were horizontally aligned on the whole surface. At positions where the liquid crystals were dropped, however, dropping traces were observed in a state where no voltage was applied. Next, the liquid crystal display panel was irradiated with the ultraviolet ray without polarization at an irradiation intensity of 1 mW/cm² and with irradiation energy of 9000 mJ/cm². The liquid crystals were vertically aligned on the whole surface. When the halftone display was performed, no dropping trace was observed over the whole gray scales and a very favorable alignment was obtained.

According to this embodiment as described above, the liquid crystal display device, particularly, the liquid crystal display device of the type of vertical alignment as represented by the MVA system requires no step of forming the alignment film enabling the cost of production to be greatly decreased. At the same time, further, the liquid crystal display device featuring excellent reliability is realized. Even when a very large mother glass that the conventional apparatus for printing the alignment film can not respond to is used, it is made possible to easily form the ultraviolet ray-cured product for controlling the alignment of liquid crystals without being affected by the size. The ultraviolet ray-cured product can similarly be formed with ease for controlling the alignment of liquid crystals even by using a substrate on which the alignment film cannot be easily printed, such as a substrate having a large degree of ruggedness, a substrate of a bent shape or a film-like substrate. According to this embodiment, therefore, a liquid crystal display device featuring good liquid crystal alignment even by using a mother glass of a large size or a substrate of a special shape is realized.

Second Embodiment

Next, the method of producing the liquid crystal display device according to the second embodiment of the invention will be described with reference to FIGS. 10 to 19. This embodiment is concerned with the method of producing the liquid crystal display device capable of decreasing the cost of production and increasing the yield of production.

In the steps of producing the liquid crystal display device of the MVA system, one of the causes decreasing the yield of production is the occurrence of a defect in the step of forming the alignment film. In the steps of forming the alignment film, the defect stems from various factors. The factor related to the material may be the defective formation of the alignment film due to a repelling phenomenon. The repelling phenomenon occurs due to the surface tension of the substrate surface or a decreased thickness of the alignment film at the protrusions of a dielectric formed on the substrate surface, and causes disturbance in the alignment of the liquid crystals. Another factor stems from the facility or the technology for printing the alignment film, which is not capable of responding to the modern large substrates. Therefore, it is difficult to produce the liquid crystal display devices using large substrates maintaining a high yield.

According to Japanese Patent Application No. 2003-94169 filed by the present applicant, there has been proposed a technology for forming an ultraviolet ray-cured product on the interfaces of the substrates by mixing the monomer (photopolymerizable resin) in the liquid crystals and irradiating the liquid crystals with an ultraviolet ray. According to the above technology, the liquid crystals can be vertically aligned without applying the traditional vertical alignment film, and it can be expected to decrease the cost of production such as material cost and facility cost, and to improve the production yield. Besides, the above technology is capable of responding to the mother glasses of large sizes for the modern liquid crystal display devices. However, the above technology still involves some problems as described below. A first problem is that there remains horizontally aligned region that is visually perceived as white lines due to defective alignment of liquid crystals. A second problem is that because a UV beam of a low intensity must be irradiated for extended periods of time to vertically align the liquid crystals to a perfect degree, productivity is not necessarily high. A third problem is concerned with the stability of the vertical alignment of the liquid crystals due to the heat cycles. When cooled down to room temperature after once heated to a temperature higher than an NI point of the liquid crystals (phase transition temperature between the nematic phase and the isotropic liquid phase), there develops the above defective alignment that is visually perceived as white lines.

This embodiment realizes a production process for improving the stability of the vertical alignment of liquid crystals by improving the above problems. According to this embodiment, it is made possible to produce the liquid crystal display device at a decreased production cost maintaining an improved production yield as a result of vertically aligning the liquid crystals without forming the conventional alignment film.

Figure 10A:
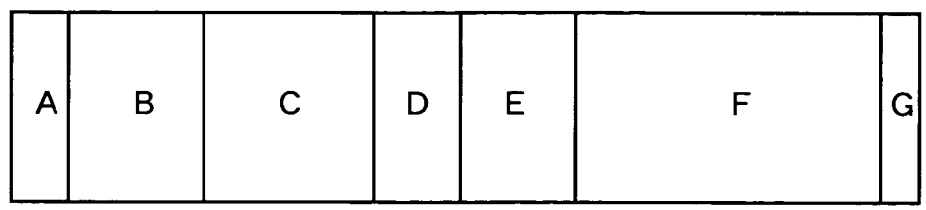
FIGS. 10A through 10C are diagrams comparing a conventional production process of liquid crystal display with a process for producing the liquid crystal display device according to a second embodiment of the invention.
Figure 10B:
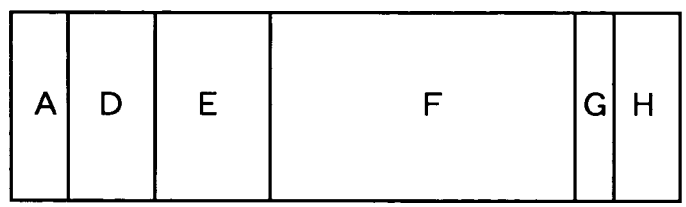
Figure 10C:
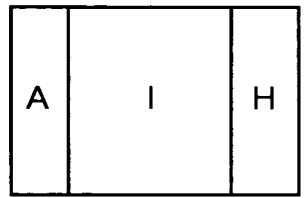

FIG. 10 is a diagram comparing a conventional production process (panel step) for producing the liquid crystal display device with a production process (panel step) for producing the liquid crystal display device according to this embodiment, wherein FIG. 10A illustrates a conventional process for producing the liquid crystal display device by forming an alignment film as a layer for controlling the alignment and injecting the liquid crystals by a dip-type vacuum injection method, and FIG. 10B illustrates a process for producing the liquid crystal display device without forming the alignment film but forming, on the interfaces of the substrates, an ultraviolet ray-cured product as a layer for controlling the alignment. FIG. 10C illustrates a process for producing the liquid crystal display device by injecting the liquid crystals by the drop-injection method instead of the dip-type method. In FIGS. 10A, 10B and 10C, the transverse direction represents the production time.

As shown in FIG. 10A, the conventional production process includes a step A of washing the substrates, a step B of printing the alignment film, a step C of firing the alignment film, a step D of forming a seal, a step E of sticking the substrates together, a step F of vacuum-injecting the liquid crystals, and a step G of sealing the injection port in this order.

As shown in FIG. 10B, on the other hand, the production process which forms the ultraviolet ray-cured product as a layer for controlling the alignment includes neither the step B of printing the alignment film nor the step C of firing the alignment film, but newly includes a step H of irradiating the UV beam for polymerizing the monomer mixed into the liquid crystals after the step G of sealing the injection port. The step H of irradiating the UV beam has a tact time shorter than those of the step B of printing the alignment film and the step C of firing the alignment film. Therefore, the production time of the panel step as a whole is shortened.

As shown in FIG. 10C, the production process that is based on the drop-injection method includes a step I of drop-injection for sticking the substrates together while injecting the liquid crystals instead of including the step D of forming the seal, step E of sticking the substrates together, the step F of vacuum-injecting the liquid crystals, and the step G of sealing the injection port possessed by the production process shown in FIG. 10B. The step I of drop-injection has a tact time very shorter than those of the step D of forming the seal, the step E of sticking the substrates together, the step F of vacuum-injecting the liquid crystals, and the step G of sealing the injection port. Therefore, the production time of the panel step as a whole is very shortened.

With the production processes shown in FIGS. 10B and 10C, however, a problem remains in that the time for irradiating the UV beam is relatively long. The study had been done to solve this problem, and it was found that the liquid crystals can be easily vertically aligned when the UV beam is irradiated by using a light source B (medium mercury light source or ultra-high pressure mercury light source) emitting light having wavelengths over a range wider than that of the wavelengths of light emitted from the customarily used light source A (high pressure mercury light source).

Figure 11:
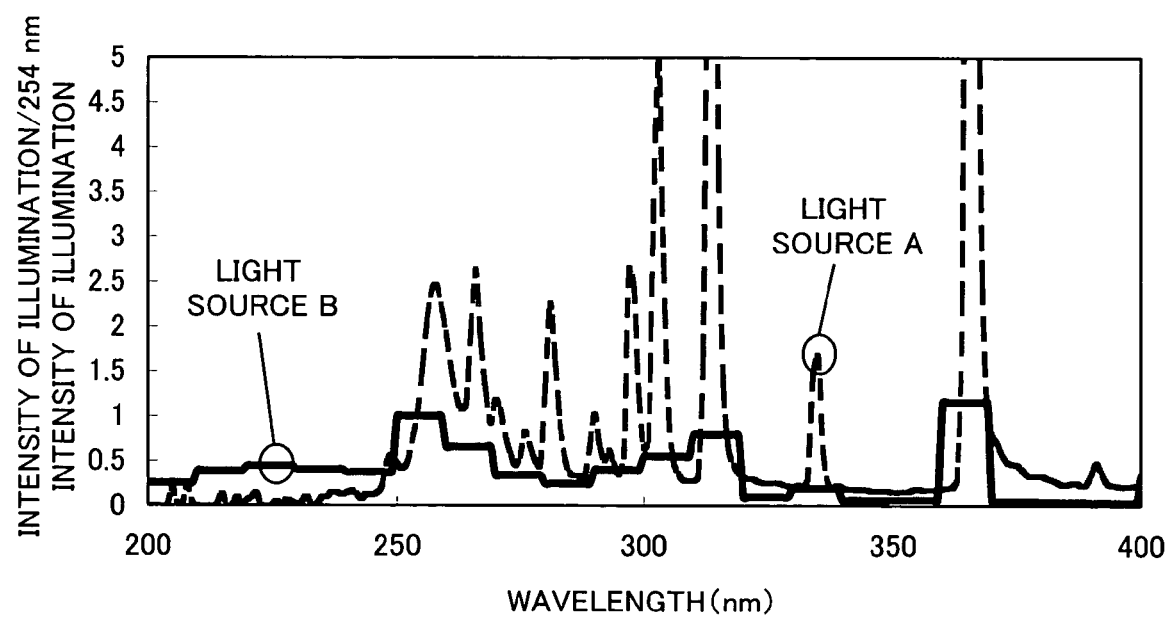
FIG. 11 is a graph illustrating spectra of wavelengths of light emitted from the light sources A and B.

FIG. 11 is a graph illustrating spectra of wavelengths of light emitted from the light sources A and B, wherein the abscissa represents the wavelength (nm) and the ordinate represents the intensity of illumination, the intensity of illumination being 1 at the wavelength of 254 nm. A broken line in the graph represents the spectrum of wavelengths of light emitted from the light source A, and a solid line represents the spectrum of wavelengths of light emitted from the light source B. As shown in FIG. 11, the light source B has the spectrum over a range wider than that of the wavelengths of light emitted from the light source A.

FIG. 12 is a diagram comparing the states of alignment of liquid crystals by the ultraviolet ray-cured products formed by using the light sources A and B. As shown in FIG. 12A, first, an empty panel was fabricated by sticking a pair of glass substrates together via a sealing member 48. A monofunctional acrylate monomer and a bifunctional acrylate monomer were mixed at a mol ratio of 10:1, and the mixture was mixed in an amount of 2% by weight into the nematic liquid crystals LCa having a negative dielectric anisotropy. The liquid crystals into which the monomer was mixed were injected into the empty panel, and were sealed to fabricate a liquid crystal panel 46. Next, the liquid crystal panel 46 was irradiated with a UV beam to form an ultraviolet ray-cured product for controlling the alignment of the liquid crystals. Here, the region of the liquid crystal panel 46 on the left side in the drawing was irradiated with the beam from the light source A with irradiation energy of 9 J/cm$^2$ for an irradiation time of 100 minutes in a customary manner, and the region on the right side in the drawing was irradiated with scanning beam from the light source B with irradiation energy of 4 J/cm$^2$ for an irradiation time of 2 minutes.

The state of alignment of the liquid crystal panel 46 was evaluated. The state of alignment was evaluated by arranging a pair of polarizing plates in cross-nicol on the outer side of the liquid crystal panel 46 and irradiating light from the rear side. As a result, as shown in FIG. 12B, it was learned that the vertical alignment comparable to, or superior to, that of the region of the left side was obtained even in the region on the right side in the drawing that had been irradiated with the UV beam for an irradiation time one-fiftieth of that of the prior art. As described above, use of the light source that emit light of wavelengths including short wavelengths over a wide range makes it possible to greatly shorten the tact time of the step of irradiation with the UV beam. However, it has been learned that irradiating the liquid crystals with the UV beam containing much short wavelengths (shorter than 330 nm) adversely affects the long-time reliability. In this embodiment, therefore, a study was conducted to use another method as described below.

Figure 13A:
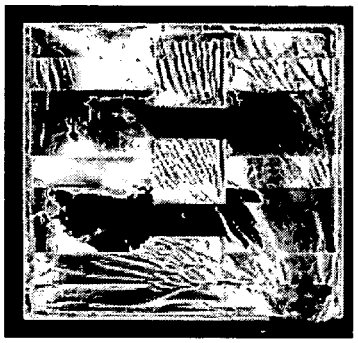
FIGS. 13A through 13C are views illustrating the states of alignment of the liquid crystal panel fabricated by forming only the transparent electrodes on the whole opposing surfaces of a pair of glass substrates.
Figure 13B:
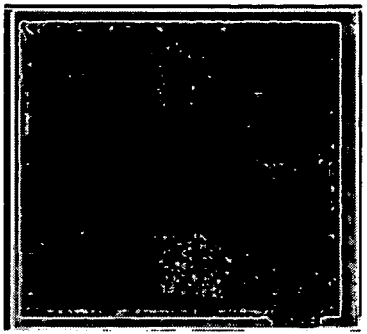
Figure 13C:
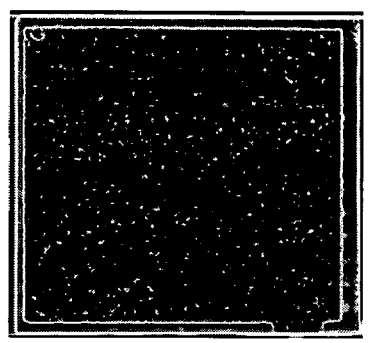
Figure 14A:
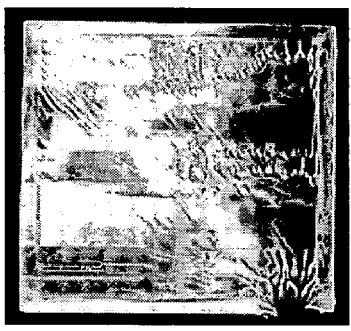
FIGS. 14A through 14C are views illustrating the states of alignment of the liquid crystal panel fabricated by forming a plurality of bus lines, TFTs and pixel electrodes on one glass substrate and forming transparent electrodes and column spacers of a photosensitive resin on the other glass substrate.
Figure 14B:
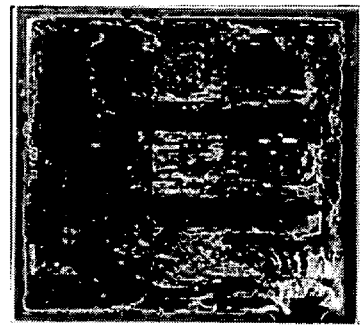
Figure 14C:
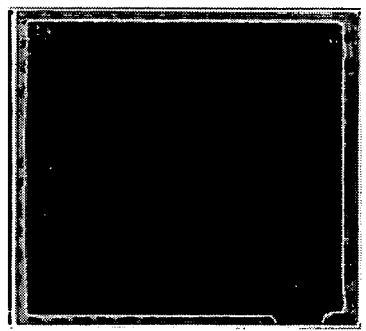
Figure 15A:
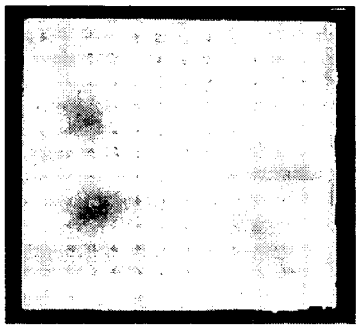
FIGS. 15A through 15C are views illustrating the states of alignment of the liquid crystal panel fabricated by forming only transparent electrodes on one glass substrate and forming a CF layer, transparent electrodes, linear protrusions for regulating the alignment and column spacers on the other glass substrate.
Figure 15B:
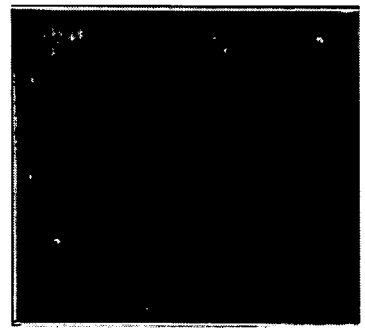
Figure 15C:
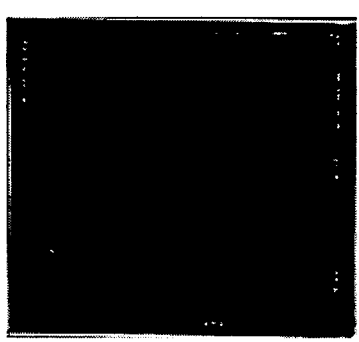

FIGS. 13 to 15 illustrate states of alignment of liquid crystals in which various structures are formed on the glass substrates of the liquid crystal panels. FIG. 13 illustrates a state of alignment of a liquid crystal panel fabricated by forming only transparent electrodes of ITO on the whole opposing surfaces of the pair of glass substrates, dispersing the bead spacers, and sticking the two glass substrates together. FIG. 14 illustrates a state of alignment of a liquid crystal panel forming a plurality of bus lines, TFTs and pixel electrodes on one glass substrate as shown in FIG. 16A, and forming column spacers comprising transparent electrodes and a photosensitive resin on the other glass substrate as shown in FIG. 16B. FIG. 15 illustrates a state of alignment of a liquid crystal panel forming only transparent electrodes on one glass substrate, and forming a color filter (CF) layer, transparent electrodes, linear protrusions for regulating the alignment and column spacers on the other glass substrate as shown in FIG. 16C. Here, the liquid crystal panels shown in FIGS. 13 to 15 all have a cell thickness of 4 μm. As the liquid crystals to be injected into the liquid crystal panels, those liquid crystals having a negative dielectric anisotropy to which in an amount of 2% by weight, a mixture obtained by mixing a monofunctional acrylate monomer and a bifunctional acrylate monomer mixed at a molar ratio of 10:1 was mixed, were used. The liquid crystals were injected into the panel by the dip-type vacuum injection method. FIGS. 13A, 14A and 15A illustrate the initial states of alignment after the liquid crystals are injected. FIGS. 13B, 14B and 15B illustrate the states of alignment after the liquid crystals are irradiated with a UV beam using the above light source A with irradiation energy of 9 J/cm$^2$ to put the monomer (or oligomer) to cause the curing reaction (polymerization, crosslinking). In the liquid crystal panel of FIG. 14, the UV beam was irradiated from the side of the glass substrate on which the plurality of bus lines, TFTs and pixel electrodes were formed. In the liquid crystal panel of FIG. 15, the UV beam was irradiated from the side of the glass substrate on which only the transparent electrodes were formed. FIGS. 13C, 14C and 15C illustrate the states of alignment after the isotropic treatment was executed.

In the liquid crystal panel forming only the transparent electrode on the glass substrate as illustrated in FIGS. 13A to 13C, the liquid crystals can be nearly vertically aligned by the irradiation with the UV beam. However, the defect of white lines is visually perceived when the isotropic treatment is executed, and the contrast decreases.

In the liquid crystal panel forming the plurality of bus lines, TFTs and pixel electrodes on one glass substrate as illustrated in FIGS. 14A to 14C, it was learned that excellent vertical alignment and heat stability were obtained by the irradiation with the UV beam followed by the heat treatment. The bus lines and the electrodes of TFTs worked as shielding structures suppressing the transmission of the UV beam. Therefore, the liquid crystals in some regions were not irradiated with the UV beam, and the monomers in the liquid crystals remained in such regions. It is considered that excellent vertical alignment and heat stability were obtained by the heat treatment in a state where the monomers partly remained in the liquid crystals. The same effect was obtained by irradiating the UV beam through a photomask forming, at least partly, a drawing pattern for suppressing the transmission of light instead of irradiating the UV beam through the shielding structures such as the bus lines and the electrodes of TFTs. It was further learned that the vertical alignment was more stabilized when column spacers formed on the surface of the substrate by the photolithography method were used than when the bead spacers were used.

In the liquid crystal panel forming the CF layer, transparent electrodes, linear protrusions and column spacers on one glass substrate as shown in FIG. 15A, it was learned that the initial state of liquid crystal alignment was more homogeneous than that of the liquid crystal panel shown in FIG. 13. Since the CF layer and the linear protrusions which are protrusions having heights smaller than the cell thickness, were formed on the glass substrate, ruggedness having certain heights was formed on the substrate. Even when the liquid crystals were injected by the dip-type vacuum injection method, therefore, the alignment of liquid crystals after injection became homogeneous owing to the ruggedness. As shown in FIGS. 15B and 15C, therefore, relatively good vertical alignment and heat stability were obtained even when the UV beam was irradiated from the side of the glass substrate on which only the transparent electrodes were formed.

Figure 17A:
FIGS. 17A through 17C are views illustrating the states of alignment of the liquid crystals when different materials are used to form the uppermost surfaces of the pair of substrates.
Figure 17B:
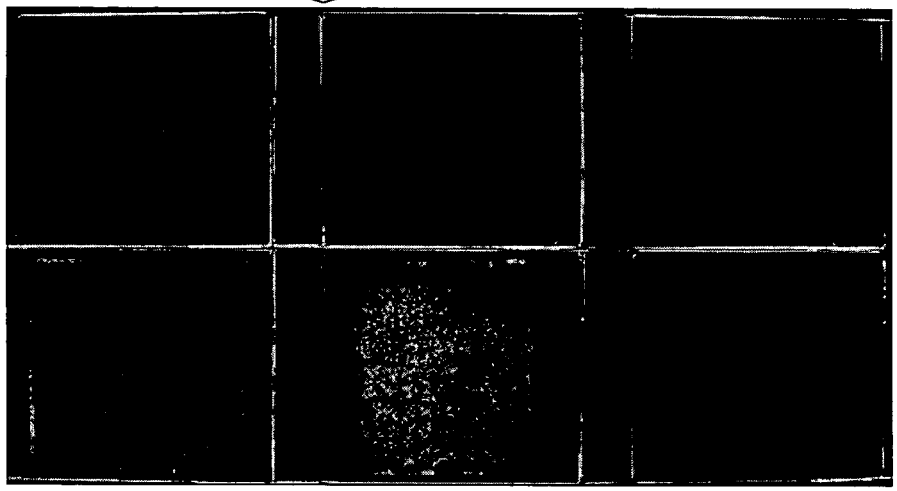
Figure 17C:
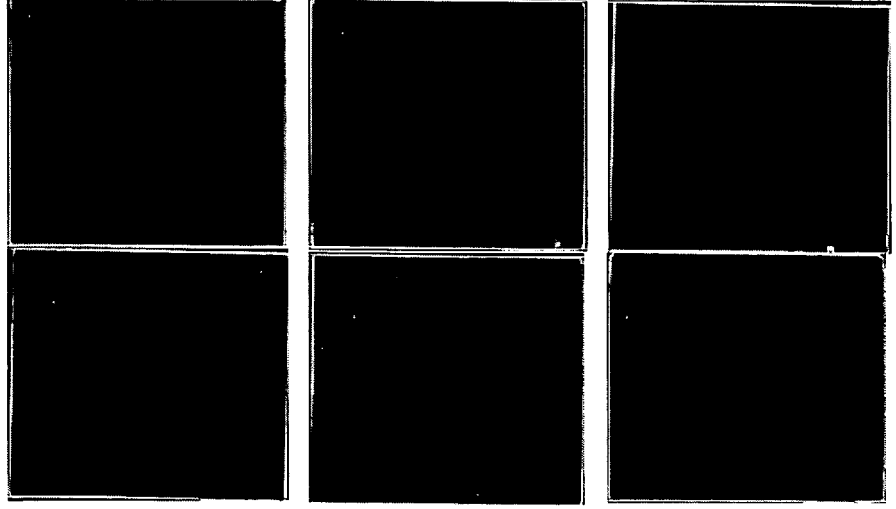

Next, described below is the state of alignment of liquid crystals when the material forming the uppermost surfaces (surfaces coming in contact with the liquid crystals) of the pair of substrates was varied. FIGS. 17A to 17C illustrate the states of alignment of six pieces of liquid crystal panels, respectively. FIG. 17A illustrates the initial state of alignment after the liquid crystals was injected. FIG. 17B illustrates the state of alignment after the monomer was polymerized by irradiating the liquid crystals with the UV beam. FIG. 17C illustrates the state of alignment after the isotropic treatment was executed. The left sides of FIGS. 17A to 17C are illustrating liquid crystal panels in which the transparent electrodes of ITO are formed on the whole uppermost surfaces of the substrates. The centers of FIGS. 17A to 17C are illustrating liquid crystal panels in which a dielectric layer of silicon nitride ($SiN_x$) is formed on portions of the uppermost surfaces like the general TFT substrates, and transparent electrodes of ITO are formed on other portions. The right sides of FIGS. 17A to 17C are illustrating liquid crystal panels in which a dielectric layer of $SiN_x$ is formed on the whole uppermost surfaces of the substrates. As the liquid crystals to be injected into the liquid crystal panels, those liquid crystals having a negative dielectric anisotropy to which in an amount of 2% by weight, a mixture obtained by mixing a monofunctional acrylate monomer and a bifunctional acrylate monomer at a molar ratio of 10:1 was mixed, were used. The liquid crystals were injected into the panels by the dip-type vacuum injection method. A polymerization initiator (IRG 651) was added in an amount of 2 mol % to the liquid crystals of three pieces of liquid crystal panels in the upper stage of FIGS. 17A to 17C. No polymerization initiator was added to the liquid crystals of three pieces of liquid crystal panels of the lower stage.

When the liquid crystal panels aligned in the state as shown in FIG. 17A were irradiated with the UV beam, the three pieces of liquid crystal panels of the upper stage in which the polymerization initiator was added to the liquid crystals exhibited better vertical alignment than those of the lower stage as shown in FIG. 17B. This is because, the monomer in the liquid crystals underwent the reaction at an increased rate when the polymerization initiator was added to the liquid crystals. After the isotropic treatment was executed, however, the three pieces of liquid crystal panels of the lower stage in which no polymerization initiator was added to the liquid crystals also exhibited good vertical alignment as shown in FIG. 17C. When the materials forming the uppermost surfaces were compared, the highest reaction rate was exhibited by the monomer in the liquid crystal panel which possessed the dielectric layer formed on the whole uppermost surfaces. The next highest reaction rate was exhibited by the monomer in the liquid crystal panel which possessed the dielectric layer formed on portions of the uppermost surfaces and possessed the transparent electrodes formed on other portions. The lowest reaction rate was exhibited by the monomer of the liquid crystal panel which possessed the transparent electrodes formed on the whole uppermost surfaces. The same results were obtained when a silicon oxide ($SiO_x$) or an organic resin was used as a material forming the dielectric layer.

The method of producing the liquid crystal display device according to this embodiment will be described more concretely by way of Examples.

EXAMPLE 2-1

First, a TFT substrate forming a plurality of bus lines, TFTs and pixel electrodes, and an opposing substrate forming a CF layer and a common electrode was prepared. Next, a monofunctional acrylate monomer and a bifunctional acrylate monomer were mixed at a mol ratio of 10:1, and the mixture was mixed in an amount of 2% by weight to nematic liquid crystals LCa having a negative dielectric anisotropy. Further, the liquid crystals were divided into two groups, and a polymerization initiator was added to one group but no polymerization initiator was added to the other group. A sealing member of the type that cures with visible light was applied onto the whole outer circumference of one substrate, the liquid crystals were dropped onto the other substrate, and the two substrates were stuck together to prepare a liquid crystal display panel. There were fabricated two kinds of liquid crystal display panels, i.e., the one having the polymerization initiator added to the liquid crystals and the one without the polymerization initiator being added with. In this state, the liquid crystals in the liquid crystal display panels were arranged nearly in parallel with the substrate surfaces (see FIG. 18A). In this Example, the liquid crystals were aligned relatively homogeneously since the opposing substrates were rugged due to the formation of the CF layer.

Next, by using a source of UV beam (high pressure mercury light source, low pressure mercury light source, medium pressure mercury light source or ultra-high pressure mercury light source), the liquid crystals were irradiated with the UV beam from the side of the TFT substrate. When the UV beam was irradiated from the side of the TFT substrate, the bus lines and the electrodes of TFTs on the TFT substrate worked as shielding structures. Therefore, the liquid crystals in some regions were not irradiated with the UV beam, and the monomer remained in the liquid crystals in such regions. An ultraviolet ray-cured product was formed on the interface of the substrate of a region irradiated with the UV beam. In this state, therefore, the liquid crystals were partly aligned vertically to the substrate surface (see FIG. 18B).

Figure 18A:
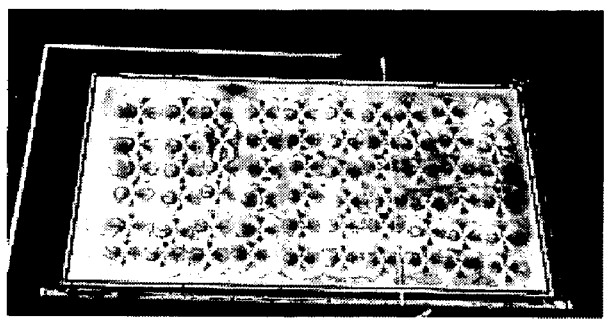
FIGS. 18A through 18C are views illustrating a method of producing the liquid crystal display device according to Example 2-1 of the second embodiment of the invention.
Figure 18B:
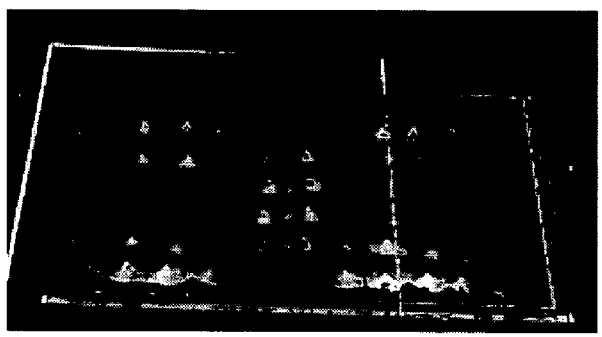
Figure 18C:
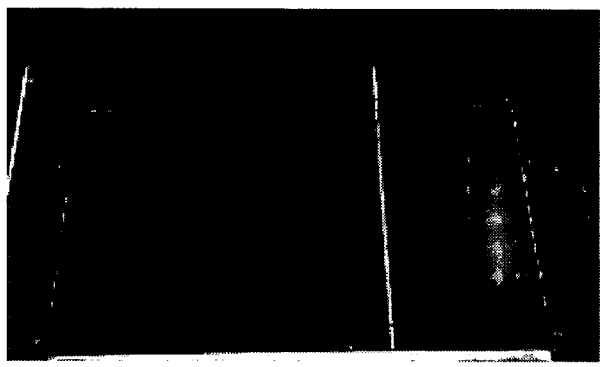
Figure 19:
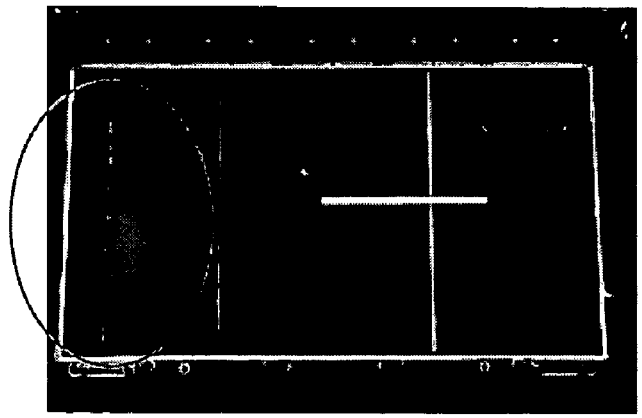
FIG. 19 is a view illustrating a region of defective alignment in the liquid crystal display panel.
Figure 20A:
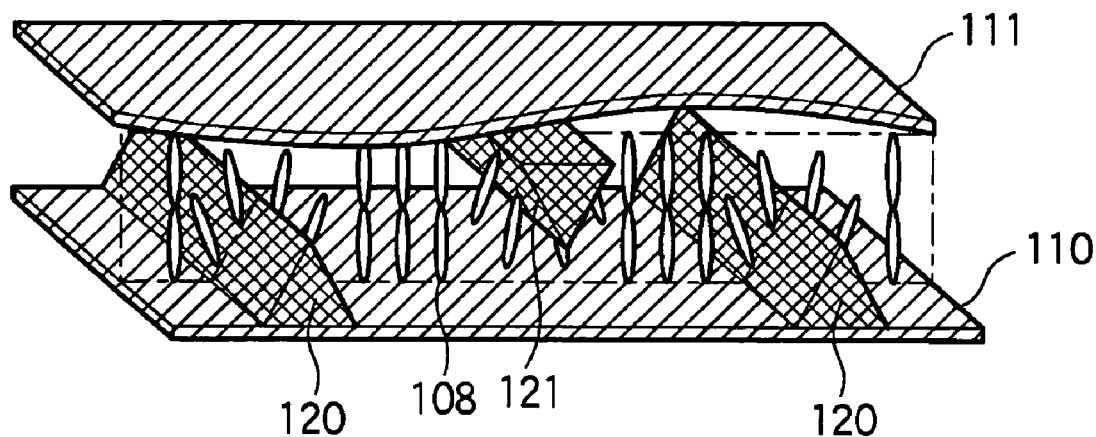
FIGS. 20A and 20B are perspective views illustrating, in cross section, the liquid crystal display device of the MVA system.
Figure 20B:
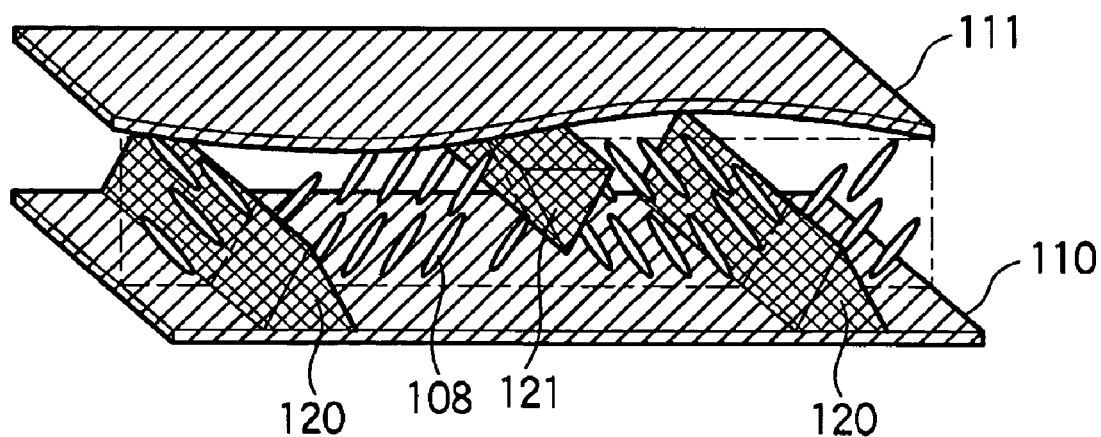

Next, the liquid crystal display panel was put to the isotropic treatment. The liquid crystal display panel exhibited good vertical alignment as shown in FIG. 18C. The TFTs were driven and evaluated as shown in FIG. 19. Defective alignment was confirmed in some region (region surrounded by an ellipse in the left in FIG. 19). It was learned that the cell of this region possessed a thickness of about 12 μm which was about 3 times as great as the cell thickness (about 4 μm) of the normal portion. From the above results, it was estimated that the cell thickness should be desirably not larger than 12 μm.

When compared based on the presence of the polymerization initiator, the liquid crystal display panel to which the polymerization initiator was added exhibited vertical alignment upon the irradiation with the UV beam for a relatively short period of time. The liquid crystal display panel without the polymerization initiator had to be irradiated with the UV beam of low irradiation energy for an extended period of time, but exhibited better alignment than that of the liquid crystal display panel to which the polymerization initiator had been added. That is, it was learned that the polymerization initiator is better added when priority is placed on shortening the tact time and the polymerization initiator is better not added when priority is placed on the display quality.

EXAMPLE 2-2

First, a TFT substrate forming a plurality of bus lines, TFTs and pixel electrodes, and an opposing substrate forming a CF layer, a common electrode and protrusions for regulating the alignment was prepared. Next, a monofunctional acrylate monomer and a bifunctional acrylate monomer were mixed at a mol ratio of 15:1, and the mixture was mixed in an amount of 2% by weight to nematic liquid crystals LCa having a negative dielectric anisotropy. Further, the liquid crystals were divided into two groups, and a polymerization initiator was added to one group but no polymerization initiator was added to the other group. A sealing member of the type that cures with the UV beam was applied onto the whole outer circumference of one substrate, the liquid crystals were dropped onto the other substrate, and the two substrates were stuck together to prepare a liquid crystal display panel. There were fabricated two kinds of liquid crystal display panels, i.e., the one having the polymerization initiator added to the liquid crystals and the one without the polymerization initiator being added with.

Next, by using a source of UV beam (high pressure mercury light source, low pressure mercury light source, medium pressure mercury light source or ultra-high pressure mercury light source), the liquid crystals were irradiated with the UV beam from the side of the TFT substrate. When the UV beam was irradiated from the side of the TFT substrate, the bus lines and the electrodes of TFTs on the TFT substrate worked as shielding structures. Therefore, the liquid crystals in some regions were not irradiated with the UV beam, and the monomer remained in the liquid crystals in such regions.

Next, the liquid crystal display panel was put to the isotropic treatment. Through this treatment, there was obtained a liquid crystal display panel of the MVA type in which the liquid crystals had been vertically aligned nearly homogeneously. Like in Example 2-1, above, the liquid crystal display panel to which the polymerization initiator was added exhibited vertical alignment upon the irradiation with the UV beam for a relatively short period of time. The liquid crystal display panel without the polymerization initiator had to be irradiated with the UV beam of low irradiation energy for an extended period of time, but exhibited better alignment than that of the liquid crystal display panel to which the polymerization initiator had been added. That is, it was learned that the polymerization initiator is better added when priority is placed on shortening the tact time and the polymerization initiator is better not added when priority is placed on the display quality.

EXAMPLE 2-3

First, a TFT substrate forming a plurality of bus lines, TFTs and pixel electrodes, and an opposing substrate forming a CF layer, a common electrode and protrusions for regulating the alignment was prepared. Next, the two substrates were attached together via a sealing member to prepare an empty panel. Next, a monofunctional acrylate monomer and a bifunctional acrylate monomer were mixed at a mol ratio of 15:1, and the mixture was mixed in an amount of 3% by weight to nematic liquid crystals LCa having a negative dielectric anisotropy. Next, the liquid crystals were injected into the empty panel by the dip-type vacuum injection method to fabricate a liquid crystal display panel.

The liquid crystals were irradiated with the UV beam from the side of the TFT substrate. When the UV beam was irradiated from the side of the TFT substrate, the bus lines and the electrodes of TFTs on the TFT substrate worked as shielding structures. Therefore, the liquid crystals in some regions were not irradiated with the UV beam, and the monomer in the liquid crystals remained in such regions. Next, the liquid crystal display panel was put to the isotropic treatment. Through this treatment, the liquid crystals could be vertically aligned nearly homogeneously.

EXAMPLE 2-4

First, a TFT substrate forming electric field control electrodes for driving the liquid crystals by a transverse electric field system, and an opposing substrate forming a light-shielding film (BM) for sectionalizing the pixel regions and a CF layer was prepared. On the CF layer of the opposing substrate was formed nothing or a flat resin film or a dielectric layer of $SiN_x$ or $SiO_x$. Next, the two substrates were attached together via a sealing member to prepare an empty panel. Next, a monofunctional acrylate monomer and a bifunctional acrylate monomer were mixed at a mol ratio of 10:1, and the mixture was mixed in an amount of 2% by weight to nematic liquid crystals LCa having a negative dielectric anisotropy. To the liquid crystals was further added a polymerization initiator. The liquid crystals were injected into the empty panel by the dip-type vacuum injection method to fabricate a liquid crystal display panel.

Next, the liquid crystals were irradiated with the UV beam from the side of the TFT substrate or from the side of the opposing substrate. When the UV beam was irradiated from the side of the TFT substrate, the bus lines and the electrodes of TFTs on the TFT substrate worked as shielding structures. When the UV beam was irradiated from the side of the opposing substrate, the BM and the like worked as shielding structures. Therefore, the liquid crystals in some regions were not irradiated with the UV beam, and the monomer in the liquid crystals remained in such regions. Next, the liquid crystal display panel was put to the isotropic treatment. Through this treatment, the liquid crystals could be vertically aligned nearly homogeneously. In this embodiment, the liquid crystal display panel of the VA-IPS system featuring a wide viewing angle and a high speed response could be realized at a low cost.

EXAMPLE 2-5

First, a TFT substrate forming a plurality of bus lines, TFTs and pixel electrodes, and an opposing substrate forming a BM, a CF layer and a common electrode was prepared. Next, the two substrates were stuck together via a sealing member to prepare an empty panel. Next, a monofunctional acrylate monomer was mixed in an amount of 3% by weight to nematic liquid crystals LCa having a negative dielectric anisotropy. The liquid crystals were injected into the empty panel by the dip-type vacuum injection method to fabricate a liquid crystal display panel.

Next, the liquid crystals were irradiated with the UV beam from the side of the TFT substrate or from the side of the opposing substrate. When the UV beam was irradiated from the side of the TFT substrate, the bus lines and the electrodes of TFTs on the TFT substrate worked as shielding structures. When the UV beam was irradiated from the side of the opposing substrate, the BM and the like worked as shielding structures. Therefore, the liquid crystals in some regions were not irradiated with the UV beam, and the monomer in the liquid crystals remained in such regions. Next, the liquid crystal display panel was put to the isotropic treatment. Through this treatment, the liquid crystals could be vertically aligned nearly homogeneously.

EXAMPLE 2-6

First, a TFT substrate forming a plurality of bus lines, TFTs and pixel electrodes, and an opposing substrate forming a CF layer, a common electrode and protrusions for regulating the alignment was prepared. Next, a monofunctional acrylate monomer and a bifunctional acrylate oligomer (polymer) were mixed at a mol ratio of 10:1, and the mixture was mixed in an amount of 2% by weight to nematic liquid crystals LCa having a negative dielectric anisotropy. To the liquid crystals, a polymerization initiator was further added. A sealing member of the type that cures with visible light was applied onto the whole outer circumference of one substrate, the liquid crystals were dropped onto the other substrate, and the two substrates were stuck together to fabricate a liquid crystal display panel.

Next, the liquid crystals were irradiated with the UV beam from the side of the TFT substrate. When the UV beam was irradiated from the side of the TFT substrate, the bus lines and the electrodes of TFTs on the TFT substrate worked as shielding structures. Therefore, the liquid crystals in some regions were not irradiated with the UV beam, and the monomer in the liquid crystals remained in such regions. Next, the liquid crystal display panel was put to the isotropic treatment. Through this treatment, the liquid crystals could be vertically aligned nearly homogeneously and a liquid crystal display panel of the MVA system was obtained.

This invention is not limited to the above embodiments but can be modified in a variety of ways.

Though the above embodiments have dealt with the liquid crystal display devices of the transmission type, the invention is not limited thereto but can be applied to other liquid crystal display devices such as the reflection type and the half-transmission type.

Further, though the above embodiments have dealt with the liquid crystal display devices of the active matrix type, the invention is not limited thereto but can also be applied to the liquid crystal display device of a simple matrix type.

What is claimed is:

1. A liquid crystal display device comprising:
a pair of substrates arranged facing each other;
a liquid crystal seated between the pair of substrates; and
a photo-cured product having a side chain structure for controlling an alignment of the liquid crystal, the photo-cured product being formed near interfaces to the pair of substrates upon polymerizing a polymerizable component containing a polyfunctional monomer having a symmetrical structure mixed in the liquid crystal with light,
wherein a ratio of the polyfunctional monomer remaining in the liquid crystals is not larger than 20% by weight relative to a total amount of unreacted monomers remaining in the liquid crystal.

2. A liquid crystal display device according to claim 1, wherein the polyfunctional monomer includes a ring structure.

3. A liquid crystal display device according to claim 1, wherein the polyfunctional monomer includes a bifunctional monomer having a flexible structure.

4. A liquid crystal display device according to claim 1, wherein the polyfunctional monomer has a structure represented by the chemical formula (1),

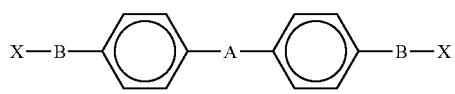

wherein X is an acrylate group or a methacrylate group, A represents the chemical formula (2),

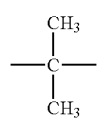

the chemical formula (3),

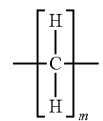

or the chemical formula (4),

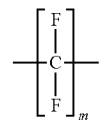

and B represents the chemical formula (5),

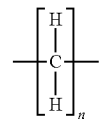

or the chemical formula (6),

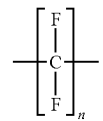

and m and n are 0 or integers of 1 or larger.

5. A liquid crystal display device according to claim 4, wherein m and n are 0 or 1, respectively.

6. A liquid crystal display device according to claim 1, wherein an alignment film for controlling the alignment of the liquid crystal and formed by coating is not formed near the interfaces between the pair of substrates and the liquid crystal.

7. A liquid crystal display device according to claim 1, wherein the liquid crystal is sealed by the drop injection method.

8. A liquid crystal display device according to claim 1, further comprising a plurality of column spacers formed on the substrates to maintain a cell gap between the pair of substrates.

9. A liquid crystal display device according to claim 1, wherein:
the liquid crystal has a negative dielectric anisotropy and is nearly vertically aligned to the substrate surfaces when no voltage is applied; and
a structure for regulating the alignment is formed on at least either one of the pair of substrates to regulate a direction of alignment of the liquid crystal when a voltage is applied.

10. A method of producing a liquid crystal display device, comprising the steps of:
sealing, between a pair of substrates, a liquid crystal into which a polymerizable component containing a polyfunctional monomer having a symmetrical structure is mixed;
polymerizing the polymerizable component by irradiating the liquid crystal with light cutting off a region of short wavelengths which are shorter than 310 nm; and forming a light-cured product having a side-chain structure near interfaces to the pair of substrates,
wherein a ratio of the polyfunctional monomer remaining in the liquid crystals is not larger than 20% by weight relative to a total amount of unreacted monomers remaining in the liquid crystals.

11. A liquid crystal display device according to claim 1, wherein the polyfunctional monomer has a structure that can be polymerized with light of a wavelength of not shorter than 310 nm with the liquid crystal as a solvent; and
an intensity at the wavelength of 310 nm is about 0.02 to about 0.05 mW/cm$^2$.

12. A liquid crystal display device according to claim 1, wherein the side chain structure comprises an alkoxyl group.

* * * * *